(12) United States Patent
Nagao et al.

(10) Patent No.: US 6,594,570 B2
(45) Date of Patent: Jul. 15, 2003

(54) SYSTEMS AND METHODS FOR CONTROLLING A VEHICLE-OCCUPANT PROTECTING APPARATUS

(75) Inventors: Tomoki Nagao, Nagoya (JP); Motomi Iyoda, Seto (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 2 days.

(21) Appl. No.: 10/041,619

(22) Filed: Jan. 10, 2002

(65) Prior Publication Data

US 2002/0099486 A1 Jul. 25, 2002

(30) Foreign Application Priority Data

Jan. 19, 2001 (JP) .......................... 2001-012468
Jul. 27, 2001 (JP) .......................... 2001-227348

(51) Int. Cl.⁷ .......................... B60R 21/32; G06F 17/00
(52) U.S. Cl. .......................... 701/45; 701/46; 280/735; 180/282
(58) Field of Search .......................... 701/45, 46, 36, 701/37, 38; 280/735, 730.2, 756; 180/282, 268; 340/429

(56) References Cited

U.S. PATENT DOCUMENTS 5,609,358 A     3/1997  Iyoda et al. ............... 280/735
5,825,284 A  * 10/1998  Dunwoody et al. ......... 340/440
6,100,797 A     8/2000  Mattes et al. ............... 340/437
6,104,284 A     8/2000  Otsuka ........................ 340/440
6,282,474 B1 *  8/2001  Chou et al. ................... 701/45

FOREIGN PATENT DOCUMENTS

| DE | 44 40 258 A1 | 5/1996 |
| DE | 198 11 180 A1 | 9/1999 |
| JP | A 10-297422 | 11/1998 |
| JP | A 11-227556 | 8/1999 |
| JP | A 2000-9599 | 1/2000 |
| JP | A 2000-503278 | 3/2000 |
| JP | A 2000-127891 | 5/2000 |
| JP | A 2000-510407 | 8/2000 |

* cited by examiner

*Primary Examiner*—Tan Q. Nguyen
(74) *Attorney, Agent, or Firm*—Oliff & Berridge, PLC

(57) ABSTRACT

Systems and methods for controlling a vehicle-occupant protecting apparatus provided on a vehicle such that the apparatus is controlled upon determination that the vehicle has had a rollover motion, the control system including a first detector that determines whether the vehicle has crashed, a second detector that determines whether the vehicle has had a rollover motion, and an invalidating device that invalidates the determination by the second detector that the vehicle has had the rollover motion such that the determination by the second detector is invalidated for a predetermined time after the determination by the first detector that the vehicle has crashed. Furthermore, a controller controls the vehicle-occupant protecting apparatus based on outputs of the second detector and the invalidating device to prevent unnecessary operation of the vehicle-occupant protecting device.

21 Claims, 18 Drawing Sheets

FIG. 1

○ ···SATISFIED
× ···UNSATISFIED
△ ···UNCERTAIN

| | | SIDE-CRASH DOES NOT OCCUR | | SIDE-CRASH OCCURS | | | |
|---|---|---|---|---|---|---|---|
| RS OR LS | | 0 | | 1 | | 0 | |
| ROLLOVER | | NOT OCCUR | OCCUR | NOT OCCUR | OCCUR | NOT OCCUR | OCCUR |
| DETERMINATION OF RR-RA <CONDITION A> | | × | ○ | × | ○ | × | ○ |
| DETERMINATION OF RR-GY <CONDITION B> | | × | ○ | △ | △ | △ | ○ |
| DETERMINATION OF RR-RA <CONDITION C> | | × | ○ | ○ | ○ | × | ○ |
| RIGHT FLAG FR OR LEFT FLAG FL <CONDITION D,E> | | ○ | ○ | × | × | ○ | ○ |
| DETERMINATION BY PRESENT EMBODIMENT | | × | ○ | × | ○ | × | ○ |
| CONDITION A OR CONDITION B <CONVENTIONAL> | | × | ○ | △ | ○ | △ | ○ |

SYSTEMS AND METHODS FOR CONTROLLING A VEHICLE-OCCUPANT PROTECTING APPARATUS

INCORPORATION BY REFERENCE

The disclosure of Japanese Patent Application No. 2001-012468 filed on Jan. 19, 2001 and No. 2001-227348 filed Jul. 27, 2001, including the specification, drawings and abstract, is incorporated herein by reference in its entirety.

BACKGROUND OF THE INVENTION

1. Field of Invention

The present invention relates to systems and methods for controlling a vehicle-occupant protecting apparatus such that an appropriate vehicle-occupant protecting devices of the vehicle-occupant protecting apparatus is operated upon detection of a crash or a rollover motion of an automotive vehicle.

2. Description of Related Art

A control system for controlling a vehicle-occupant protecting apparatus of an automotive vehicle is well known, which includes vehicle-occupant protecting devices such as airbags and seat-belt pre-tensioners. The control system is arranged to determine whether the vehicle has a rollover motion, on the basis of roll angle and rate of the vehicle, and to operate the appropriate vehicle-occupant protecting device or devices when the rollover motion of the vehicle is detected. In this respect, it is noted that the vehicle occupants (in particular, the upper part of their bodies) are moved toward the right or left side of the vehicle body during turning of the vehicle. Accordingly, the rollover motion of the vehicle which takes place during turning of the vehicle causes a reduction of a space which is provided adjacent to an airbag disposed on the right or left side of the vehicle body, and which would accommodate the airbag that has been inflated due to the rollover motion of the vehicle.

In view of this drawback, JP-A-2000-9599 discloses a control system which is arranged to effect a determination as to whether the vehicle is turning, on the basis of the detected steering angle of the vehicle. Moreover, the control system effects a determination as to whether the vehicle has a rollover motion, on the basis of the detected roll angle and rate of the vehicle while the vehicle is not turning, and on the basis of a detected lateral acceleration value of the vehicle as well as the detected roll angle and rate, while the vehicle is turning. This arrangement permits a relatively early detection of the rollover motion of the vehicle during turning of the vehicle.

The rollover motions of the vehicle in JP-A-2000-9599 include a "trip-over" motion which takes place due to a collision of the vehicle wheel or wheels with stationary objects, such as edge blocks arranged along an edge of a roadway, and a "turn-over" motion which takes place during abrupt turning of the vehicle. A determination as to whether the vehicle has such a trip-over or turn-over motion is advantageously effected on the basis of the lateral acceleration value and the roll rate of the vehicle, since an increase of the lateral acceleration value occurs at an earlier point of time than an increase of the roll rate. However, this arrangement may cause an erroneous determination that the vehicle has a rollover motion, in the event of crashing (a side crash, in particular) of the vehicle, while in fact the vehicle does not have a rollover motion. This leads to a risk of an unnecessary operation of the vehicle-occupant protecting device or devices of the vehicle-occupant protecting apparatus.

SUMMARY OF THE INVENTION

The present invention was made in view of the drawbacks discussed above. It is therefore an object of the present invention to provide control systems and methods for a vehicle-occupant protecting apparatus, which permits accurate determination as to whether the vehicle has had a rollover motion, and which prevents an unnecessary operation of the vehicle-occupant protecting apparatus.

According to one aspect of the present invention, there is provided a control system for controlling a vehicle-occupant protecting apparatus provided on an vehicle such that the apparatus is controlled upon determination that the vehicle has a rollover motion, the control system comprising: a first detector that determines whether the vehicle has crashed; a second detector that determines whether the vehicle has a rollover motion; an invalidating device that invalidates the determination by the second detector that the vehicle has the rollover motion, such that the determination by the second detector is invalidated for a predetermined time after the determination is made by the first detector that the vehicle has crashed; and a controller that controls the vehicle-occupant protecting apparatus based on outputs of the second detector and the invalidating device. The invalidation by the invalidating device of the determination of the rollover motion may be effected by either invalidating the determination which has been made by the second detector, or preventing the second detector from making the determination per se.

According to another aspect of the present invention, there is provided a method of controlling a vehicle-occupant protecting apparatus provided on an vehicle such that the apparatus is controlled upon a determination that the vehicle has had a rollover motion, comprising the steps of; determining whether the vehicle has crashed: determining whether the vehicle has had the rollover motion; invalidating the determination that the vehicle has had the rollover motion, such that the determination is invalidated for a predetermined time after the determination is made that the vehicle has crashed; and operating the vehicle-occupant protecting apparatus based on the determination whether the vehicle has had the rollover motion and the invalidation of the determination that the vehicle has had the rollover motion.

The control system and method of the present invention described above are arranged such that the determination that the vehicle has had a rollover motion is invalidated upon determination that the vehicle has crashed or collided (a side crash, a front crash, a rear crash, etc.), for a predetermined time after the determination has been made that the vehicle has crashed. Accordingly, at least one vehicle-occupant protecting device of the vehicle-occupant protecting apparatus, which would be operated upon an actual rollover motion of the vehicle, is not actually operated for the predetermined time after the determination has been made that the vehicle has crashed, if an erroneous determination that the vehicle has had a rollover motion is made where the rollover motion has not actually taken place upon the crashing of the vehicle. Thus, the present control system and method prevent unnecessary operation of the vehicle-occupant protecting device or devices.

BRIEF DESCRIPTION OF THE DRAWINGS

The above and other objects, features, advantages, and technical and industrial significance of this invention will be better understood by reading the following detailed description of presently preferred embodiments of the invention, when considered in connection with the accompanying drawings, in which:

FIG. 1 is a table showing satisfied and unsatisfied states of conditions (A–E) of side-crash occurrences.

DETAILED DESCRIPTION OF PREFERRED EMBODIMENTS

Referring to the accompanying drawings, there will be described presently preferred embodiments of a control system of the invention for controlling a vehicle-occupant protecting apparatus provided on an automotive vehicle. The control system for the vehicle-occupant protecting apparatus functions as an airbag control device and a vehicle rollover detecting device.

First Embodiment

Figure 2:
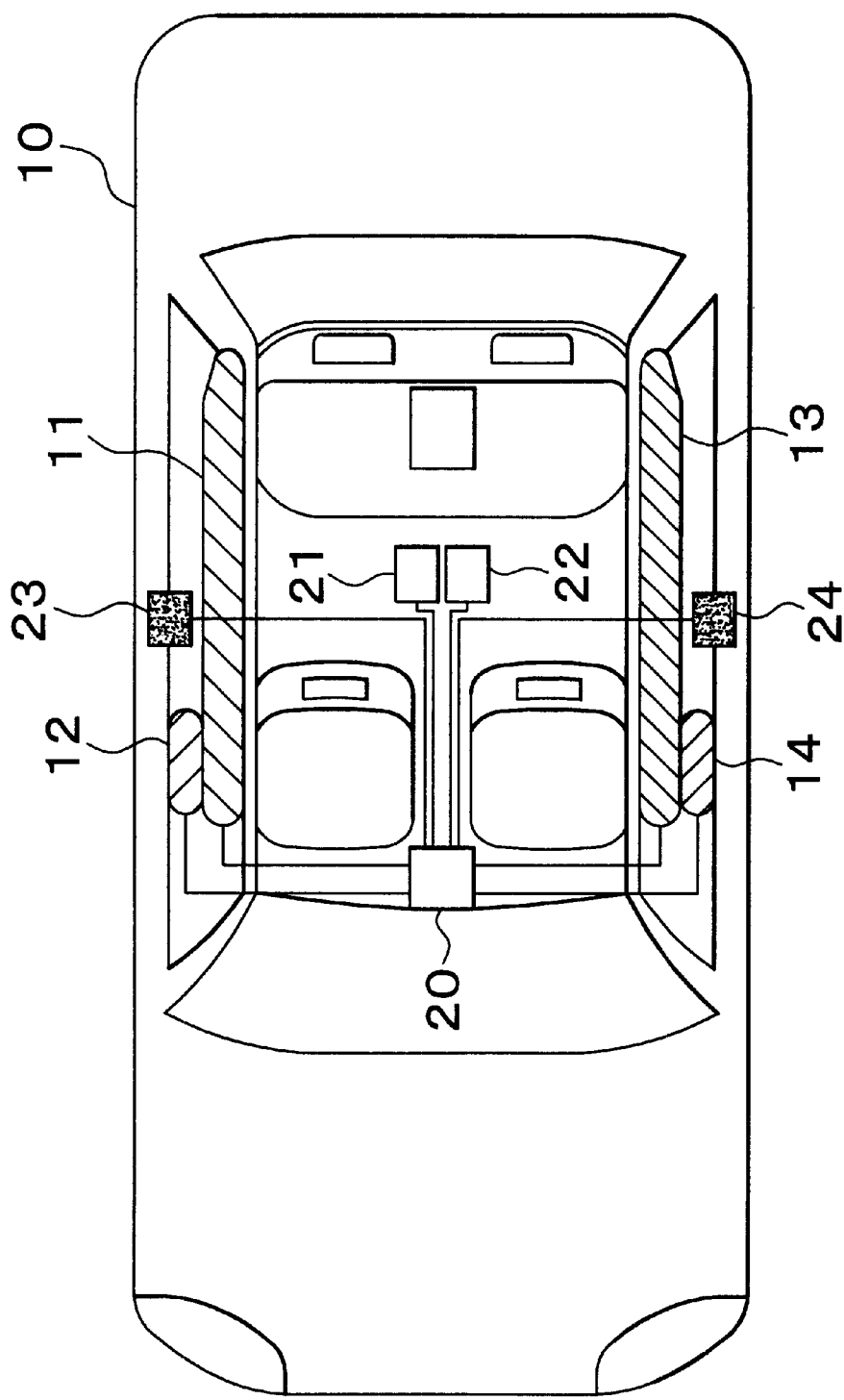
FIG. 2 is a schematic plan view of an automotive vehicle provided with a control system according to a first embodiment of this invention.

Referring first to FIG. 2, there is shown an automotive vehicle 10 provided with a vehicle-occupant protecting apparatus and a control system according to the first embodiment of this invention for controlling the vehicle-occupant protecting apparatus. The vehicle-occupant protecting apparatus includes a right curtain-shield airbag 11, a right side airbag 12, a left curtain-shield airbag 13 and a left side airbag 14. The control system includes an electric control device 20, a roll rate sensor 21, a lateral acceleration sensor 22, a right side-crash sensor 23 and a left side-crash sensor 24.

Figure 3:
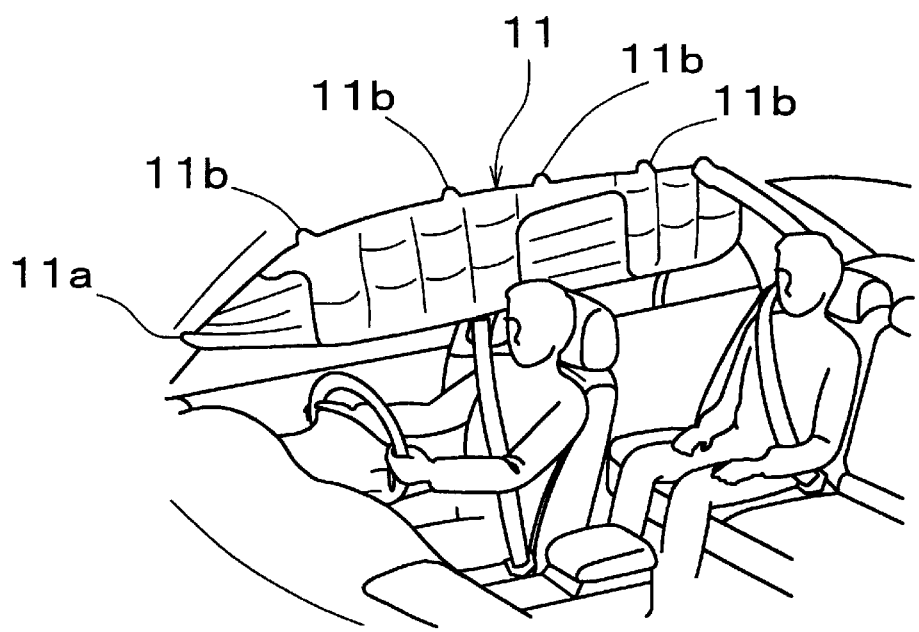
FIG. 3 is a schematic perspective view of a right curtain-shield airbag after the airbag has been inflated.

As shown in FIG. 3, the right curtain-shield airbag 11 is attached, at a font fixing portion 11a located at its front end, to a front pillar of the vehicle body, and at fixing portions 11b to a roof side rail of the vehicle body. When the right curtain-shield airbag 11 is inflated, it is expanded so as to cover substantially entire areas of a right-side front window and a right-side rear window, so that the bodies of vehicle occupants are prevented from moving in the laterally outward direction of the vehicle 10.

Figure 4:
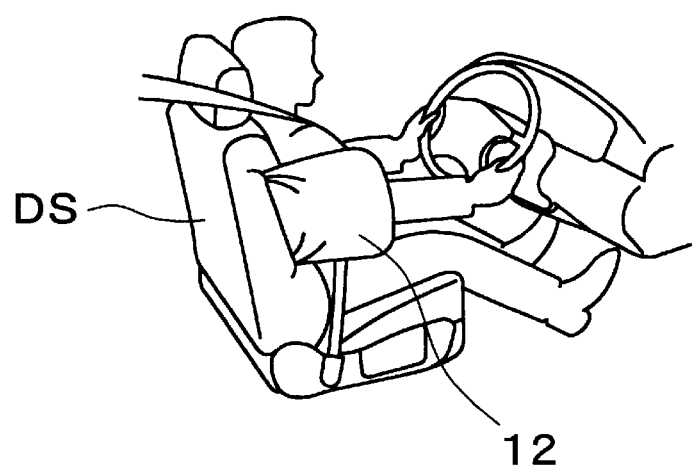
FIG. 4 is a schematic perspective view of a right side airbag after the airbag has been inflated.

As shown in FIG. 4, the right side airbag 12 is accommodated in a right end portion of a right front seat (driver's seat shown in FIG. 4) DS of the vehicle 10. When the right side airbag 12 is inflated, it is expanded so as to project from the right end portion of the right front seat DS in the forward direction of the vehicle 10, so as to protect the right-side portion of the vehicle occupant.

Since the left curtain-shield airbag 13 and the left side airbag 14 are identical with the right curtain-shield airbag 11 and the right side airbag 12, respectively, except for their positions, no further description of these airbags 13, 14 is deemed necessary. The right curtain-shield airbag 11 and the right side airbag 12 are inflated (activated) when a crash takes place on the right side of the vehicle 10 (when a right side crash of the vehicle 10 is detected), and the left curtain-shield airbag 13 and the left side airbag 14 are inflated (activated) when a crash takes place on the left side of the vehicle 10 (when a left side crash of the vehicle 10 is detected). These airbags 11–14 constitute a first vehicle-occupant protecting device. The right and left curtain-shield airbags 11, 13 are inflated (activated) when the vehicle 10 has a rollover motion (when a rollover motion of the vehicle 10 is detected).

Figure 5:
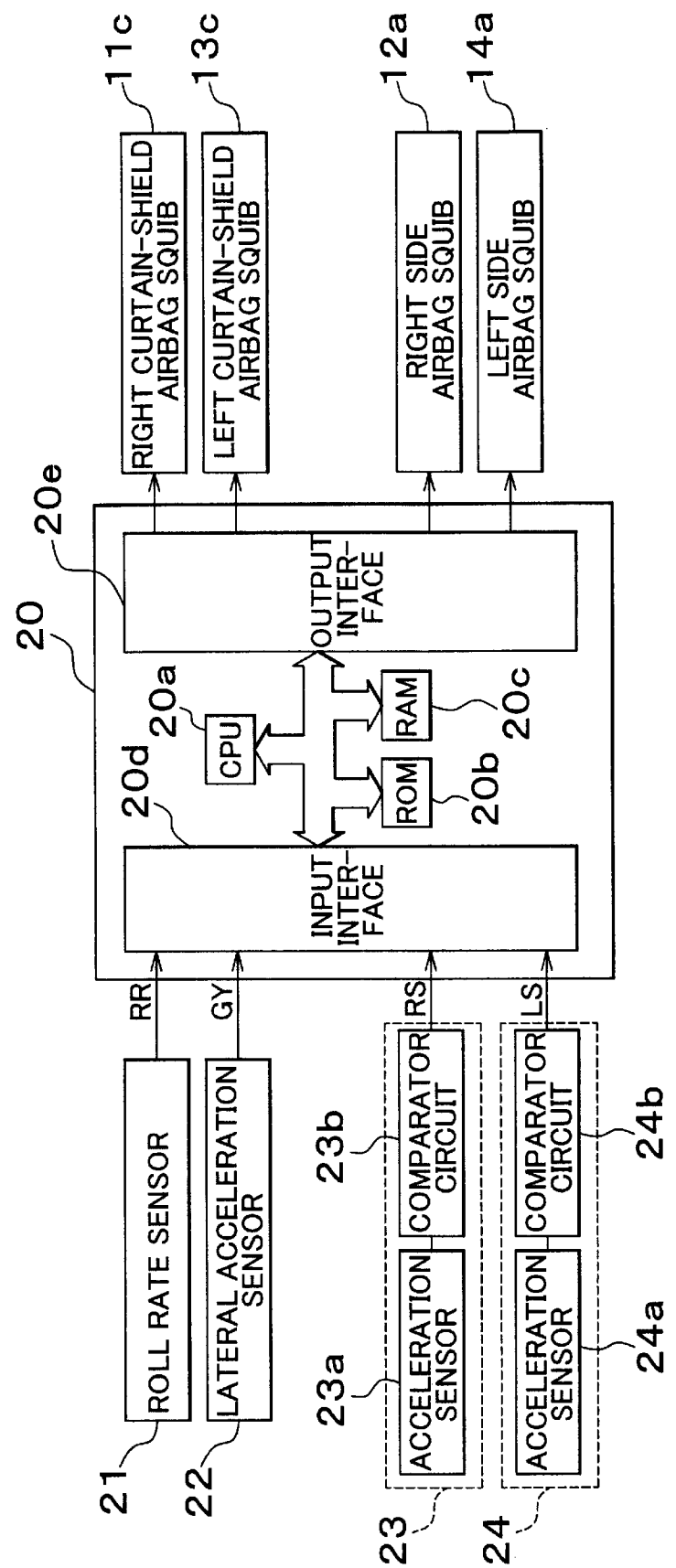
FIG. 5 is a block diagram that shows the control system for a vehicle-occupant protecting apparatus according to the first embodiment of this invention.

The electric control device 20 is constituted by a microcomputer incorporating a CPU 20a, a ROM 20b, a ROM 20c, an input interface 20d and an output interface 20e, which are interconnected with each other through a bus, as indicated in the schematic block diagram of FIG. 5. The CPU 20a is arranged to execute control programs (described below) stored in the ROM 20b, while utilizing a temporary data storage function of the RAM 20c.

To the input interface 20d of the electric control device 20, there are connected the roll rate sensor 21, lateral acceleration sensor 22, right side-crash sensor 23 and left side-crash sensor 24, the output signals of which are received by the CPU 20a. To the output interface 20e of the electric control device 20, there are connected a squib 11c for inflating the right curtain-shield airbag 11, a squib 13c for inflating the left curtain-shield airbag 13, a squib 12a for inflating the right side airbag 12, and a squib 14a for inflating the left side airbag 14. These squibs 11c, 13c, 12a, 14a will be hereinafter referred to as "right curtain-shield airbag squib 11c", "left curtain-shield airbag squib 13c", "right side airbag squib 12a" and "left side airbag squib 14a", respectively, where appropriate. The CPU 20a is arranged to apply suitable ignition signals (drive signals) to those squibs 11c, 13c, 12a, 14a.

The roll rate sensor 21 is arranged to detect an angular velocity of rotation of the vehicle body about an axis (rolling axis) which passes the center of gravity and extends in the longitudinal direction of the vehicle body. Namely, the roll rate sensor 21 is arranged to detect a roll rate RR of the vehicle 10. A positive value of the roll rate RR indicates the rate of rolling of the vehicle 10 in the clockwise direction as viewed toward the front of the vehicle 10 from a position in front of the vehicle 10, that is, in the longitudinal direction from the vehicle front toward the rear. The lateral acceleration sensor 22 is arranged to detect an acceleration GY of the vehicle 10 (vehicle body) in its lateral or transverse direction. A positive value of the acceleration GY (hereinafter referred to as "lateral acceleration value GY") indicates the acceleration in the right direction.

The right side-crash sensor (front right-crash sensor) 23 is attached to a lower portion of a right-side center pillar (right-side B pillar), and includes an acceleration sensor 23a and a comparator circuit 23b. The acceleration sensor 23a is arranged to detect a lateral acceleration value of the right-side center pillar, and the comparator circuit 23b is arranged to compare the detected lateral acceleration value with a predetermined threshold. The comparator circuit 23b generates an output signal RS which has a logical value "1" (a high level) when the detected lateral acceleration value is larger than the threshold, and a logical value "0" (a low level) when the detected lateral acceleration value is not larger than the threshold. That is, the output signal RS having the logical value "1" (high level) indicates that a crash of the vehicle 10 has taken place on its right side.

The left side-crash sensor (front left-crash sensor) 24 is attached to a lower portion of a left-side center pillar (left-side B pillar), and includes an acceleration sensor 24a and a comparator circuit 24b. The acceleration sensor 24a is arranged to detect a lateral acceleration value of the left-side center pillar, and the comparator circuit 24b is arranged to compare the detected lateral acceleration value with a predetermined threshold. The comparator circuit 24b generates an output signal LS which has a logical value "1" when the detected lateral acceleration value is larger than the threshold, and a logical value "0" when the detected lateral acceleration value is not larger than the threshold. That is, the output signal LS having the logical value "1" indicates that a crash of the vehicle 10 has taken place on its left side.

Figure 6:
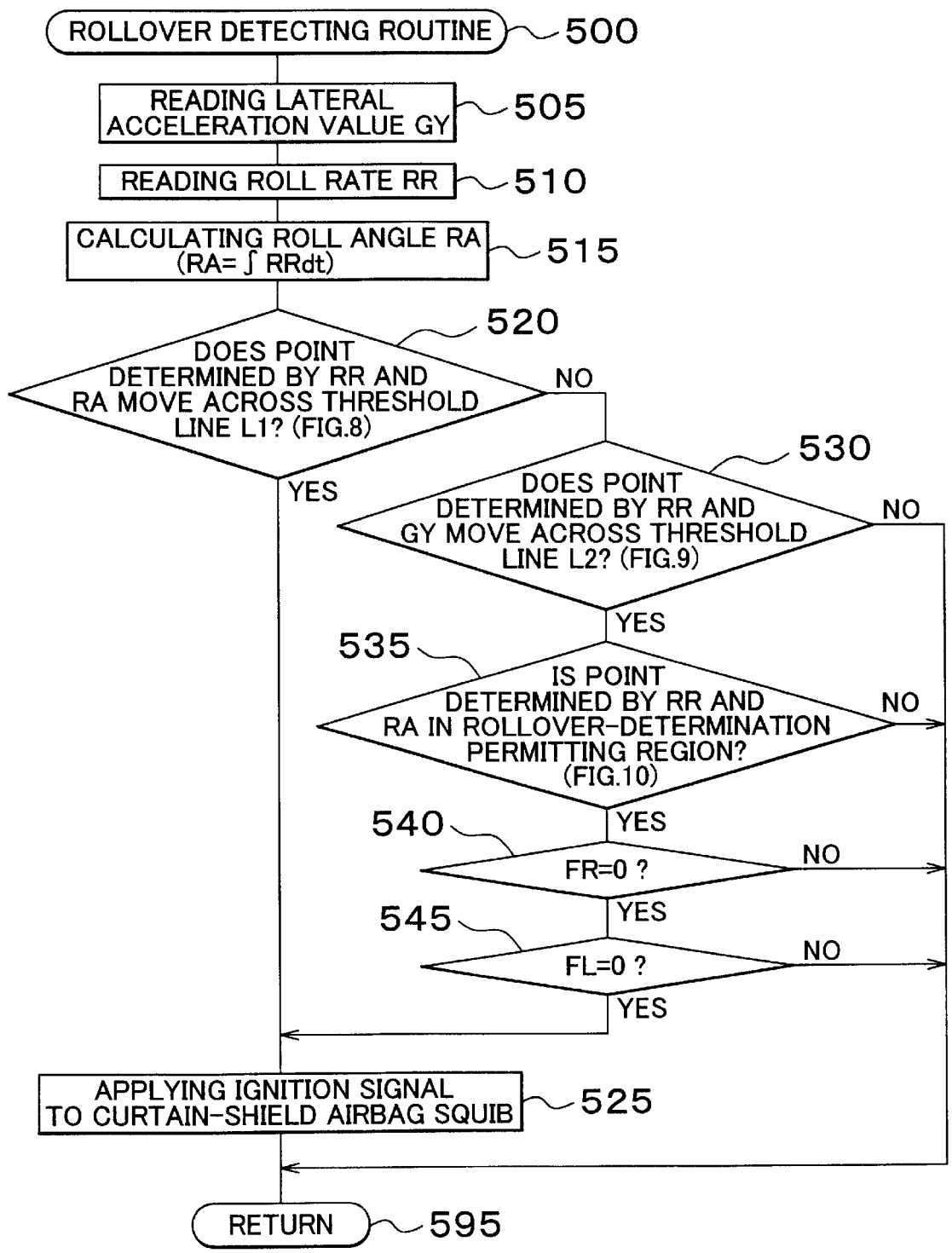
FIG. 6 is a flow chart illustrating a control program (rollover detecting routine) executed in accordance with the first embodiment of this invention.

There will next be described an operation of the control system for the vehicle-occupant protecting apparatus constructed as described above. The CPU 20a is arranged to repeatedly execute, with a predetermined cycle time, a control program (a rollover detecting routine) illustrated in the flow chart of FIG. 6. Each cycle of execution of the routine is initiated with step 500, which is followed by step 505 to read the lateral acceleration value GY represented by the output signal of the lateral acceleration sensor 22. Then, the CPU 20a goes to step 510 to read the roll rate RR represented by the output signal of the roll rate sensor 21, and to step 515 to calculate a roll angle RA of the vehicle 10 by integrating the roll rate RR.

Figure 8:
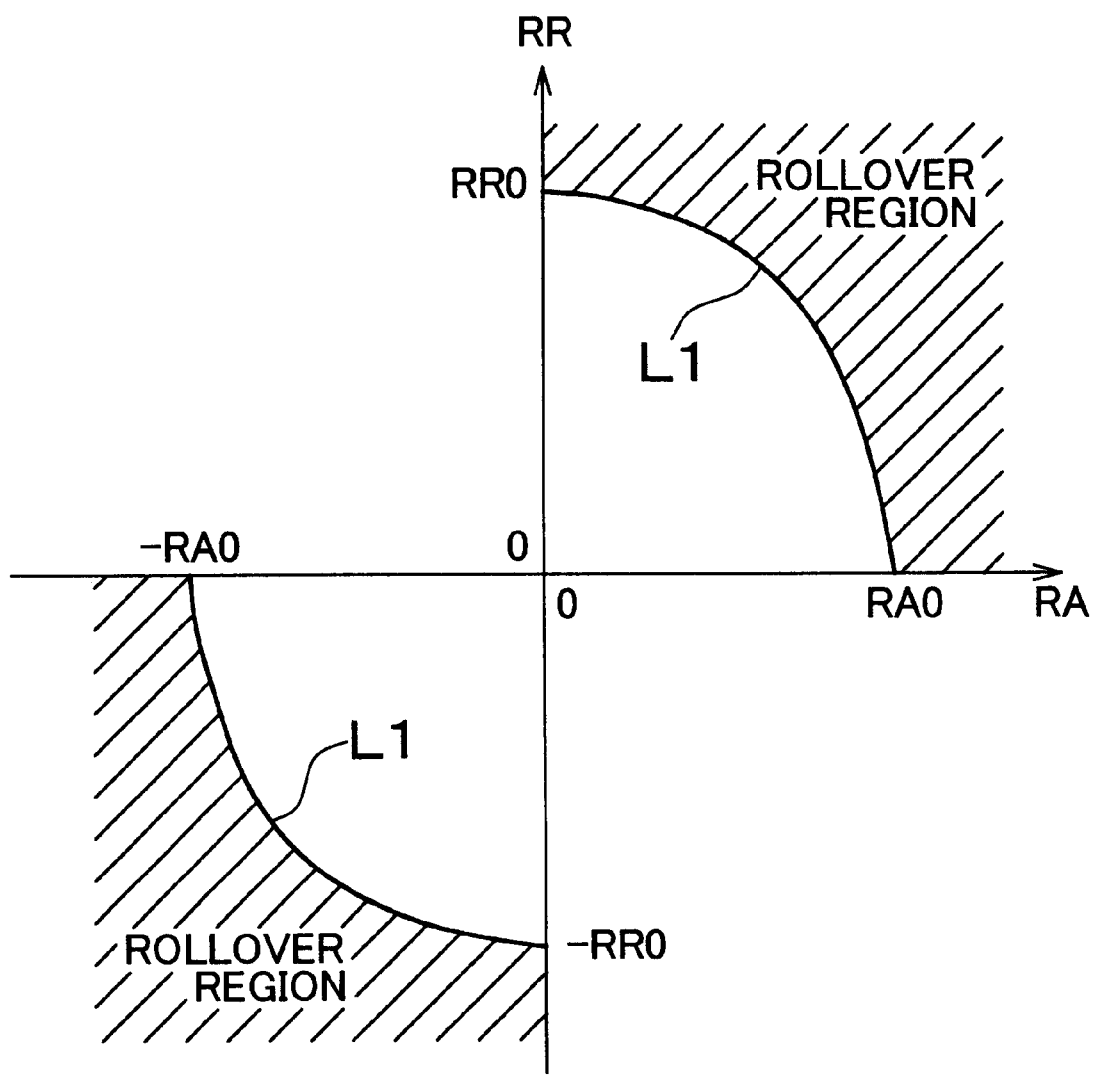
FIG. 8 is a view showing an exemplary first data map used in accordance with the first embodiment of this invention.

Then, the CPU 20a goes to step 520 to determine whether the vehicle 10 has a rollover motion. This determination in step 520 is based on a rollover data map shown in FIG. 8 relating to the roll rate RR and roll angle RA, and the actual values of the roll rate RR and angle RA obtained in steps 510 and 515. Described in detail, the CPU 20a determines whether a point (indicative of a state of the vehicle) determined by the actual roll rate RR and the actual roll rate RA has moved across a threshold line L1 which defines a relationship between the roll rate and angle RR, RA. If an affirmative decision (YES) is obtained in step 520, it indicates that the vehicle has a rollover motion, and the CPU 20a goes from step 520 to step 525 to apply the ignition signals to the right and left curtain-shield airbag squibs 11c, 13c, for inflating the right and left curtain-shield airbags 11, 13, respectively. Then, the control flow goes to step 595 in which one cycle of execution of the present rollover detecting routine is terminated.

Figure 9:
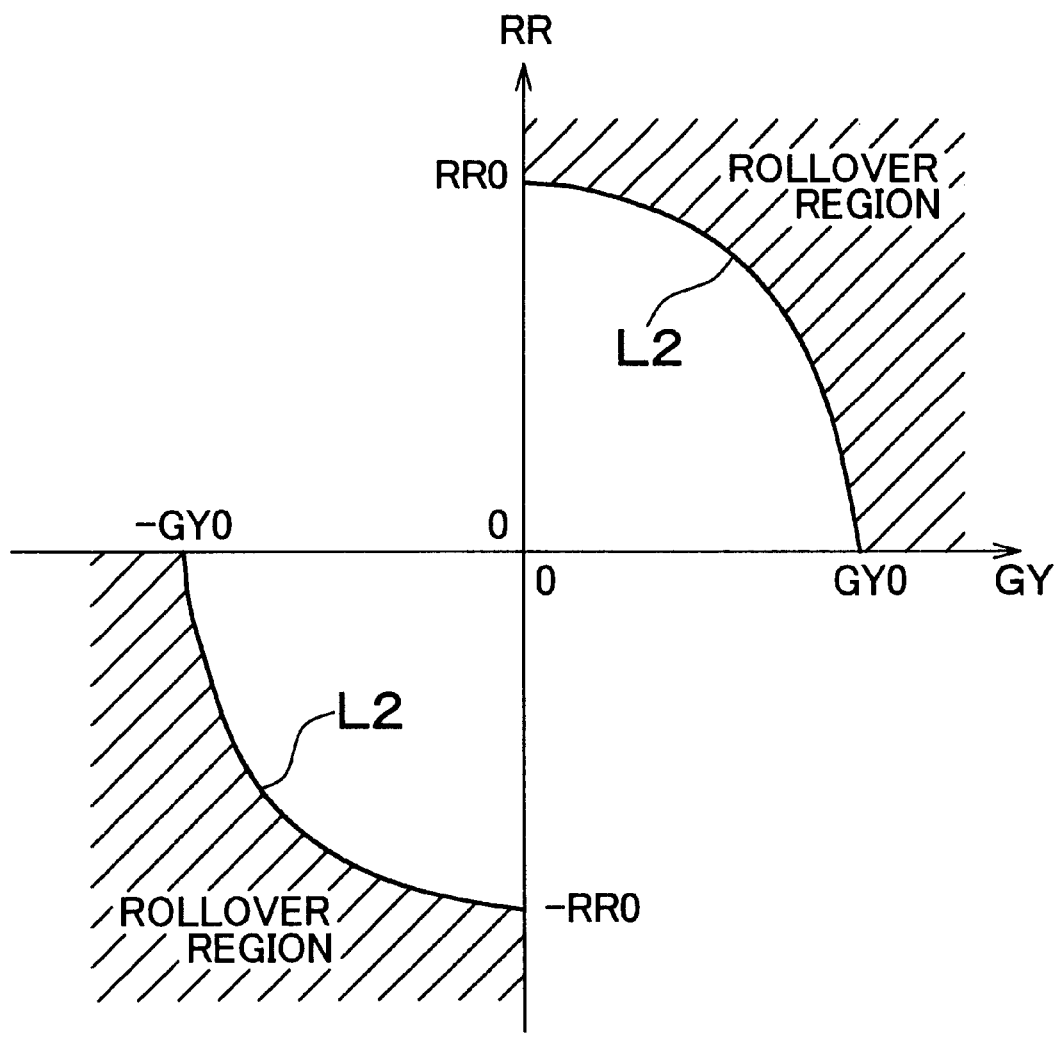
FIG. 9 is a view showing an exemplary second data map used in accordance with the first embodiment of this invention.

If it is determined in the step S520 that the point determined by the actual roll rate and angle RR, RA has not moved across the threshold line L1, that is, if a negative decision NO) is obtained in step 520, the CPU 20a goes to step 530 to effect a determination as to whether the vehicle 10 has a rollover motion. This determination is made based on a rollover data map shown in FIG. 9 that relates to the roll rate RR and the lateral acceleration value GY, and the actual values of the roll rate RR and lateral acceleration value GY obtained in steps 510 and 505. Described in detail, the CPU 20a determines whether a point (indicative of a state of the vehicle) determined by the actual roll rate RR and the actual lateral acceleration value GY has moved across a threshold line L2 which defines a relationship between the roll rate RR and the lateral acceleration value GY. If an affirmative decision (YES) is obtained in step 530, it indicates that the vehicle has a rollover motion, and the CPU 20a goes step 535. If a negative decision (NO) is obtained in step 530, it indicates that the vehicle does not have a rollover motion, and the CPU 20a goes to step 594 to terminate one cycle of execution of the present routine.

Figure 10:
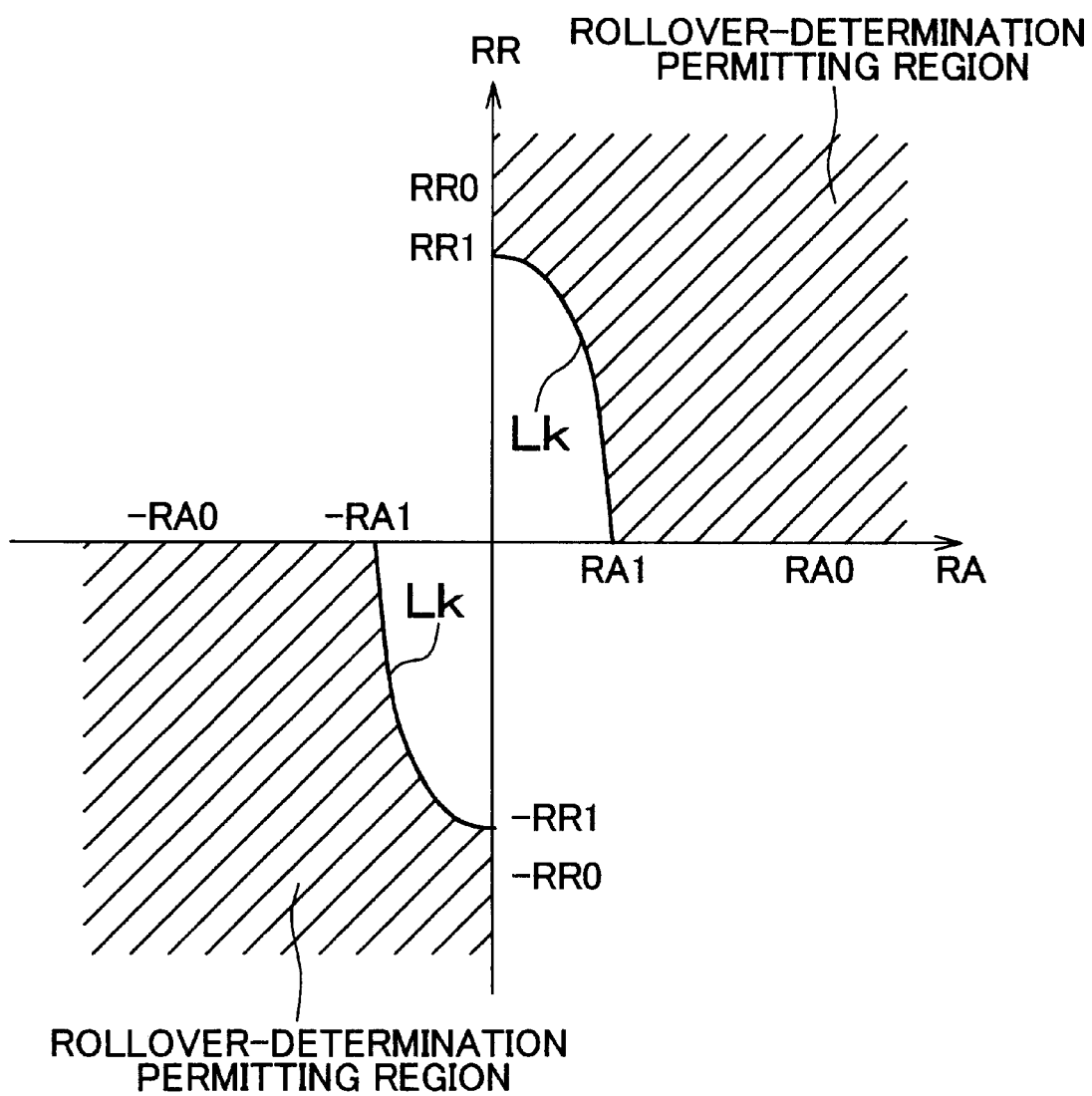
FIG. 10 is a view showing an exemplary third data map used in accordance with the first embodiment of this invention.

If the CPU 20a goes to step 535, the CPU 20a determines whether a point (indicative of a state of the vehicle) determined by the actual roll rate and angle RR, RA lies in a rollover-determination permitting region defined by a determination-permitting data map (side-crash guard data map) shown in FIG. 10 relating to the roll rate and angle RR, RA. The rollover-determination permitting region is defined in a two-dimensional coordinate system of the roll rate RR and the roll angle RA, by two threshold lines Lk and the X- and Y-axes of the coordinate system. The rollover-determination permitting region consists of areas in the coordinate system, which do not include the origin of the coordinate system. Each of the two threshold lines Lk is a boundary line on one side of which the above-indicated areas exist. When the point determined by the roll rate and angle RR, RA lies in these areas (rollover-determination permitting region), it is determined that the vehicle 10 has a rollover motion while a crash of the vehicle 10 has taken place on its right or left side, while the output signal RS or LS does not have the logical value "1." When the above-indicated point lies in the other area on the other side of each threshold like Lk, it is determined that the vehicle 10 does not have a rollover motion while a crash of the vehicle 10 has taken place on its right or left side. The CPU 20a goes to step 540 when an affirmative decision (YES) is obtained in step 535. If a negative decision (NO) is obtained in step 535, it indicates that the vehicle does not have a rollover motion, and the CPU 20a goes to step 595 to terminate one cycle of execution of the present routine.

If the CPU 20a goes to step 540, the CPU 20a determines whether a RIGHT SIDE CRASH flag FR is set at "0." As described below, this RIGHT SIDE CRASH flag FR is kept at "1" for a predetermined time T10 after the right side-crash sensor 23 has generated the output signal RS having the logical value "1," that is, after a crash of the vehicle 10 on its right side has been detected. The flag FR is set at "0" in the other cases.

If an affirmative decision (YES) is obtained in step 540, the CPU 20a goes to step 545 to determine whether a LEFT SIDE CRASH flag FL is set at "0." As described below, this RIGHT SIDE CRASH flag FL is kept at "1" for a predetermined time T20 after the left side-crash sensor 24 has generated the output signal RL having the logical value "1," that is, after a crash of the vehicle 10 on its left side has been detected. The flag FL is set at "0" in the other cases.

If an affirmative decision (YES) is obtained in step 545, the CPU 20a applies the ignition signals to the right and left curtain-shield airbag squibs 11c, 13c, for inflating both of the right and left curtain-shield airbags 11, 14. Then, the CPU 20a goes to step 595 to terminate one cycle of execution of the present routine. If a negative decision (NO) is obtained in step 540 or step 545, on the other hand, the CPU 20a directly goes to step 595 to terminate one cycle of execution of the present routine. Thus, the determination due to a side crash of the vehicle 10 that the vehicle 10 has a rollover motion, namely, the affirmative decision (YES) in step 530 is invalidated if the flag FR or FL is set at "1" (if the predetermined time T10 or T20 has not passed after the moment of detection of the side crash).

As described above, the CPU 20a is arranged to activate (or inflate) both of the right and left curtain-shield airbags 11, 13 when the affirmative decision (YES) is obtained in step 520, or when the affirmative decision (YES) is obtained in all of steps 530, 535, 540, 540, 545.

There will next be described a manner of setting the RIGHT SIDE CRASH flag FR and the LEFT SIDE CRASH flag FL and determining whether a crash of the vehicle 10 on its right or left side has taken place. The following description first refers to a case where a side crash of the vehicle 10 has not taken place. It is noted that the flags RF and FL are reset to "0" in an initializing routine executed when an ignition switch of the vehicle 10 is turned ON.

Figure 7:
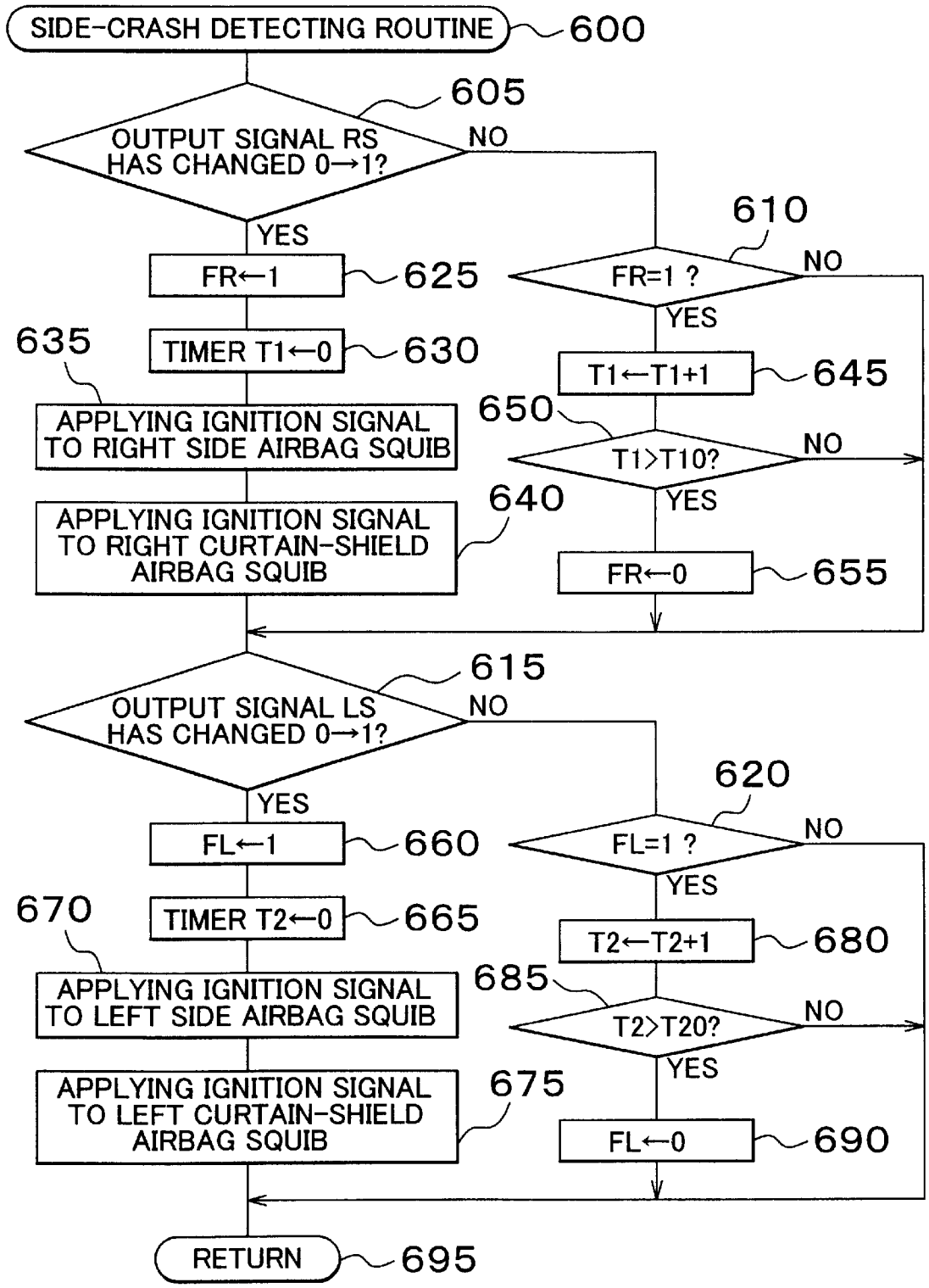
FIG. 7 is a flow chart illustrating a control program (side-crash detecting routine) executed in accordance with the first embodiment of this invention.

Reference is made to the flow chart in FIG. 7 illustrating a control program (side-crash detecting routine). This side-crash detecting routine is repeatedly executed with a predetermined cycle time. Each cycle of execution of the present routine is initiated with step 600 to determine whether the logical value of the output signal RS of the right side-crash sensor 23 has changed from "0" to "1." If a crash of the vehicle 10 on its right side has not taken place at this point of time, a negative decision (NO) is obtained in step 605, and the control flow goes to step 610 to determine whether the RIGHT SIDE CRASH flag FR is set at "1."

Since the RIGHT SIDE CRASH flag FR was reset to "0" in the initializing routine, a negative decision (NO) is obtained in step 610, and the CPU 20a goes to step 615 to determine whether the logical value of the output signal LS of the left side-crash sensor 24 has changed from "0" to "1." If a crash of the vehicle 10 on its left side has not taken place, either, at this point of time, a negative decision (NO) is obtained in step 615, and the control flow goes to step 620 to determine whether the LEFT SIDE CRASH flag FL is set at "1." Since the LEFT SIDE CRASH flag FL was also reset to "0" in the initializing routine, a negative decision (NO) is obtained in step 620, and the CPU 20a goes to step 695 to terminate one cycle of execution of the present side-crash detecting routine.

Thus, the flags FR and FL are held at "0" before a side crash of the vehicle 10 has taken place.

Then, a case where a crash of the vehicle 10 has taken place on its right side will be described. In this case, the logical value of the output signal RS of the right side-crash sensor 23 has changed from "0" to "1." Accordingly, an affirmative decision (YES) is obtained in step 605 when this step 605 is implemented during the repeated execution of the present routine. Therefore, the CPU 20a goes to step 625 to set the RIGHT SIDE CRASH flag FR to "1."

Then, the CPU 20a goes to step 630 to reset the content of a timer T1 to "0." Step 630 is followed by step 635 to apply the ignition signal to the right side airbag squib 12a, and step 640 to apply the ignition signal to the right curtain-shield airbag squib 11c. As a result, the right side airbag 12 and the right curtain-shield airbag 11 are inflated. Then, the CPU 20a goes to step 615. In this case where the logical value of the output signal LS of the left side-crash sensor 24 is kept at "0," the CPU 20a then goes to steps 620 and 695, whereby one cycle of execution of the present routine is terminated.

When a predetermined time has passed in this state, the CPU 20a initiates the next cycle of execution of the present routine with step 600. In this cycle of execution in which the logical value of the output signal RS of the right side-crash sensor 23 was already changed from "0" to "1," a negative decision (NO) is obtained in step 605, and the CPU 20a goes to step 610. Since the RIGHT SIDE CRASH flag FR was set to "1" in step 625 in the last cycle of execution of the routine, an affirmative decision (YES) is obtained in step 610, and the CPU 20a goes to step 645 to increment the content of a timer T1 by "1." Then, the CPU 20a goes to step 650 to determine whether the content of the timer T1 is larger than the predetermined threshold time T10. This threshold time T10 is a time duration during which it is required to invalidate the determination due to a right side crash of the vehicle 10 that the vehicle 10 has a rollover motion, that is, the affirmative decision (YES) in step 530 based on the detected roll rate RR and lateral acceleration value GY. That is, the affirmative decision in step 530 is invalidated for the predetermined time T10 after the moment of detection of the right side crash of the vehicle 10.

In this case where the content of the timer T1 is set at "0" due to the setting in step 630 in the last cycle, the content of the timer T1 is smaller than the threshold value T10, and a negative decision (NO) is obtained in step 650. Accordingly, the CPU 20a then goes to step 695 through steps 615 and 620, so that one cycle of execution of the present routine is terminated.

Subsequently, the CPU 20a repeatedly implement steps 600, 605, 610, 645 and 650 with the predetermined cycle time, so that the content of the timer T1 is incremented in step 650, and eventually exceeds the threshold value T10. As a result, an affirmative decision (YES) is obtained in step 650, and the CPU 20a goes to step 655 to reset the content of the RIGHT SIDE CRASH flag FR to "0." Then, the CPU 20a goes to step 695 through step 615 and 620, to terminate one cycle of execution of the present routine.

As described above, the right side airbag 12 and the right curtain-shield airbag 11 are inflated, and the RIGHT SIDE CRASH flag FR is kept at "1" for the time duration equal to the threshold time T10, when a crash of the vehicle 10 on its right side has taken place.

There will next be described a case where a crash of the vehicle 10 has taken place on its left side. In this case, the CPU 20a operates in a manner similar that in the case where the right side crash of the vehicle 10 has taken place. Described in detail, the logical value of the output signal LS of the left side-crash sensor 24 has changed from "0" to "1." Accordingly, an affirmative decision (YES) is obtained in step 615 when this step 615 is implemented during the repeated execution of the present routine. Therefore, the CPU 20a goes to step 660 to set the LEFT SIDE CRASH flag LR to "1."

Then, the CPU 20a goes to step 665 to reset the content of a timer T2 to "0." Step 665 is followed by steps 670 and 675 to apply the ignition signals to the left side airbag squib 14a and the left curtain-shield airbag squib 13c. As a result, the left side airbag 14 and the right curtain-shield airbag 13 are inflated. Then, the CPU 20a goes to step 695 to terminate one cycle of execution of the present side-crash detecting routine.

When a predetermined time has passed in this state, the CPU 20a initiates the next cycle of execution of the present routine with step 600, and goes to step 680 through steps 605, 610, 615 and 620. In step 680, the CPU 20a increments the content of a timer T2 by "1." Then, the CPU 20a goes to step 685 to determine whether the content of the timer T2 is larger than the predetermined threshold time T20. This threshold time T20 is a time duration after the moment of detection of the left side crash of the vehicle 10, during which it is required to invalidate the determination due to the left side crash that the vehicle 10 has a rollover motion, that is, the affirmative decision (YES) in step 530 based on the detected roll rate RR and lateral acceleration value GY. This threshold time T20 may be either equal to or different from the threshold time T10 described above.

In this case where the content of the timer T2 is set at "0" due to the setting in step 665 in the last cycle, the content of the timer T2 is smaller than the threshold value T20, and a negative decision (NO) is obtained in step 685. Accordingly, the CPU 20a then goes to step 695 to terminate one cycle of execution of the present routine. Subsequently, the content of the timer T2 is incremented in step 680 by repeated implementation of this step 680, so that the content of the timer T2 eventually exceeds the threshold value T20. As a result, an affirmative decision (YES) is obtained in step 685, and the CPU 20a goes to step 690 to reset the content of the LEFT SIDE CRASH flag FL to "0." Then, the CPU 20a goes to step 695 to terminate one cycle of execution of the present routine.

As described above, the left side airbag 14 and the left curtain-shield airbag 13 are inflated, and the LEFT SIDE CRASH flag FL is kept at "1" for the time duration equal to the threshold time T20, when a crash of the vehicle 10 on its left side has taken place.

Figure 11:
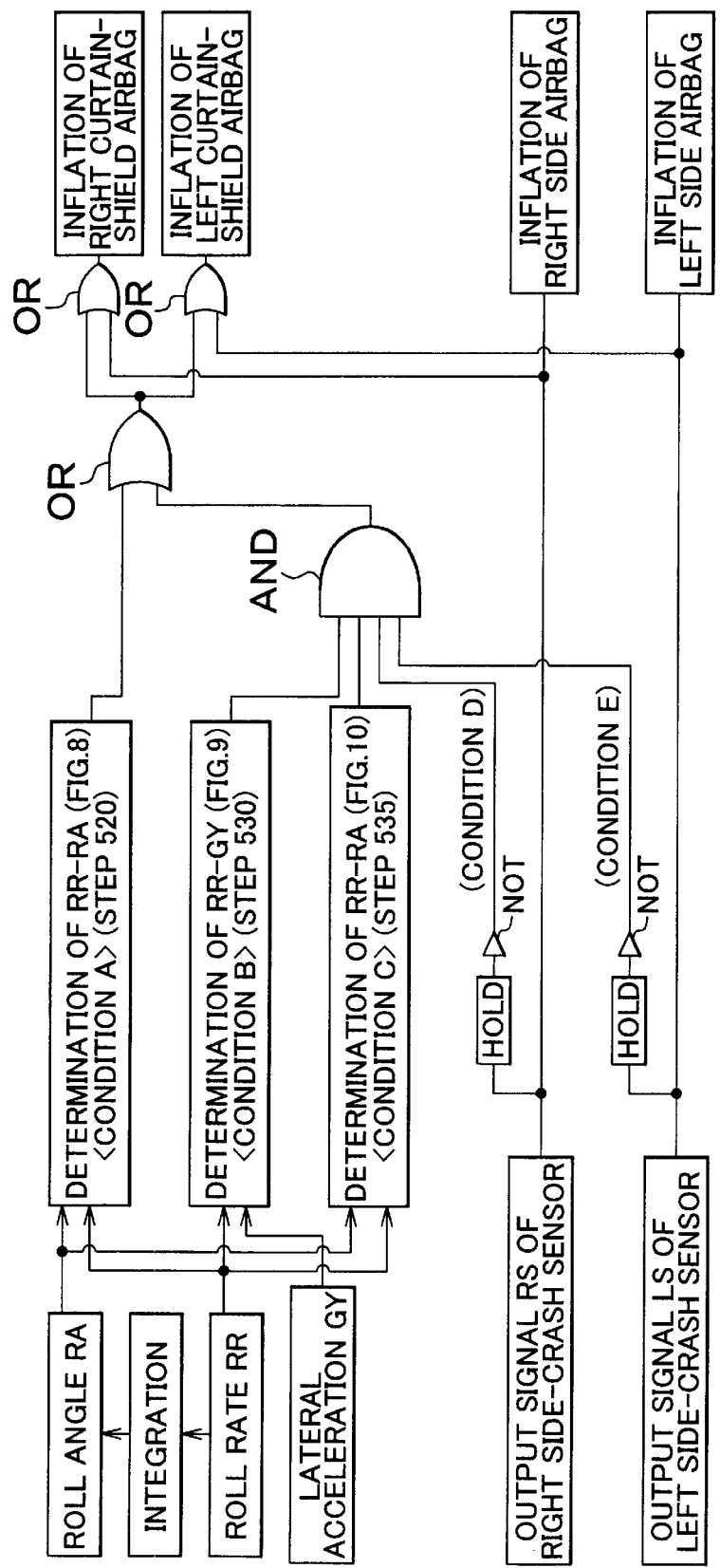
FIG. 11 is a diagram illustrating exemplary functions of the control system for the vehicle-occupant protecting apparatus according to the first embodiment of this invention.

The operation of the control system according to the present embodiment is illustrated in the logic circuit diagram of FIG. 11. Namely, the control system according to the present embodiment is arranged to determine that the vehicle 10 has a rollover motion, and inflate both of the right and left curtain-shield airbags 11 and 13, either when a rollover condition A has been satisfied, or when all of a rollover condition B, a rollover-determination permitting condition C and post-crash time conditions D and E have been satisfied. The rollover condition A is satisfied when the determination in step 520 that the vehicle 10 has a rollover motion is made on the basis of the actual roll rate and angle RR, RA and the rollover data map of FIG. 8. The rollover condition B is satisfied when the determination in step 530 that the vehicle 10 has a rollover motion is made, due to a side crash of the vehicle 10, based on the actual roll rate RR and the actual lateral acceleration value GY and the rollover data map of FIG. 9. The rollover-determination permitting condition C is satisfied when the determination in step 535 that the state of the vehicle 10 lies in the rollover-determination permitting region is made on the basis of the actual roll rate and angle RR, RA and the rollover-determination permitting data map of FIG. 10. The post-crash time condition D is satisfied when the predetermined time T10 has passed after the moment of determination that the vehicle 10 has a right side crash. The post-crash time condition E is satisfied when the predetermined time T20 has passed after the moment of determination that the vehicle 10 has a left side crash.

That is, the CPU 20a is arranged to make a determination that the vehicle 10 has a rollover motion, and inflate both of the right and left curtain-shield airbags 11, 13, when a condition {(A or (B and C and D and E) } is satisfied. The right curtain-shield airbag 11 and the right side airbag 12 are inflated when the logical value of the output signal RS of the right side-crash sensor 23 has changed to "1," and the left curtain-shield airbag 13 and the left side airbag 14 are inflated when the logical value of the output signal LS of the left side-crash sensor 24 has changed to "1." Circuits labeled "HOLD" in FIG. 11 (hereinafter referred to as "HOLD circuits") function to hold the logical value "1" of the input signal for the predetermined time (T10 or T20) after the logical value has changed from "0" to "1." Circuits labeled "NOT" in FIG. 11 function to change the logical values "1" and "0" of the input signal to "0" and "1," respectively. Therefore, when the post-crash time conditions D and E are satisfied, the outputs of the HOLD circuits are "0," which are inverted (negated) by the NOT circuits into "1" as their outputs.

FIG. 1 shows an analysis of combinations of satisfied and unsatisfied states of the above-indicated conditions A–E. It will be understood from FIG. 1 that since the rollover condition B is either satisfied or not satisfied in the case where the vehicle 10 has a side crash but does not have a rollover motion, the determination as to whether the vehicle has a rollover motion based on the logical sum of the rollover conditions A and B will be erroneous. To avoid this erroneous determination, the present embodiment is arranged to invalidate the determination on the basis of the rollover condition B, if the post-crash time conditions D and E are satisfied.

Experiments indicated that the rollover condition B is either satisfied (or not satisfied) also where the vehicle 10 has a side crash but the logical value of the output signals RS, LS of the side-crash sensors 23, 24 are "0" while the vehicle does not have a rollover motion. Therefore, the determination as to whether the vehicle has a rollover motion based on the logical sum of the rollover conditions A and B will be erroneous. To avoid this erroneous determination, the present embodiment is arranged to invalidate the determination on the basis of the rollover condition B, if the rollover-determination permitting condition C is satisfied.

When the logical value of the output signal RS of the right side-crash sensor 23 has changed to "1" in the event of a crash of the vehicle 10 on its right side, the right curtain-shield airbag 11 is inflated. If this right side crash results in the determination that the vehicle 10 has a rollover motion, the rollover condition A is satisfied, so that the left curtain-shield airbag 13 is also inflated. Similarly, when the logical value of the output signal LS of the left side-crash sensor 24 has changed to "1" in the event of a crash of the vehicle 10 on its left side, the left curtain-shield airbag 13 is inflated. If this left side crash results in the determination that the vehicle 10 has a rollover motion, the rollover condition A is satisfied, so that the right curtain-shield airbag 11 is also inflated.

Figure 12:
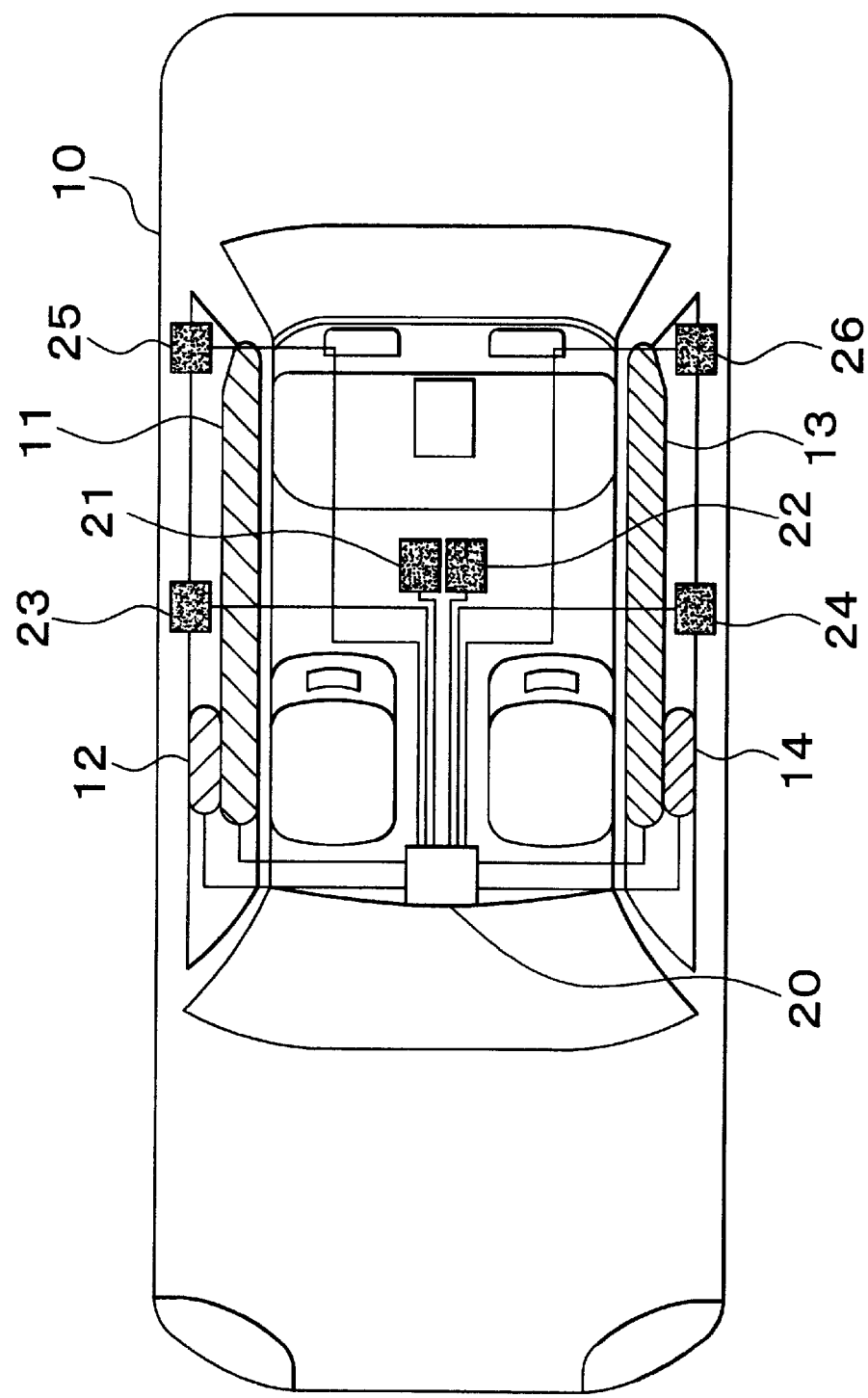
FIG. 12 is a schematic plan view of an automotive vehicle provided with a modified form of the control system according to the first embodiment of this invention.
Figure 13:
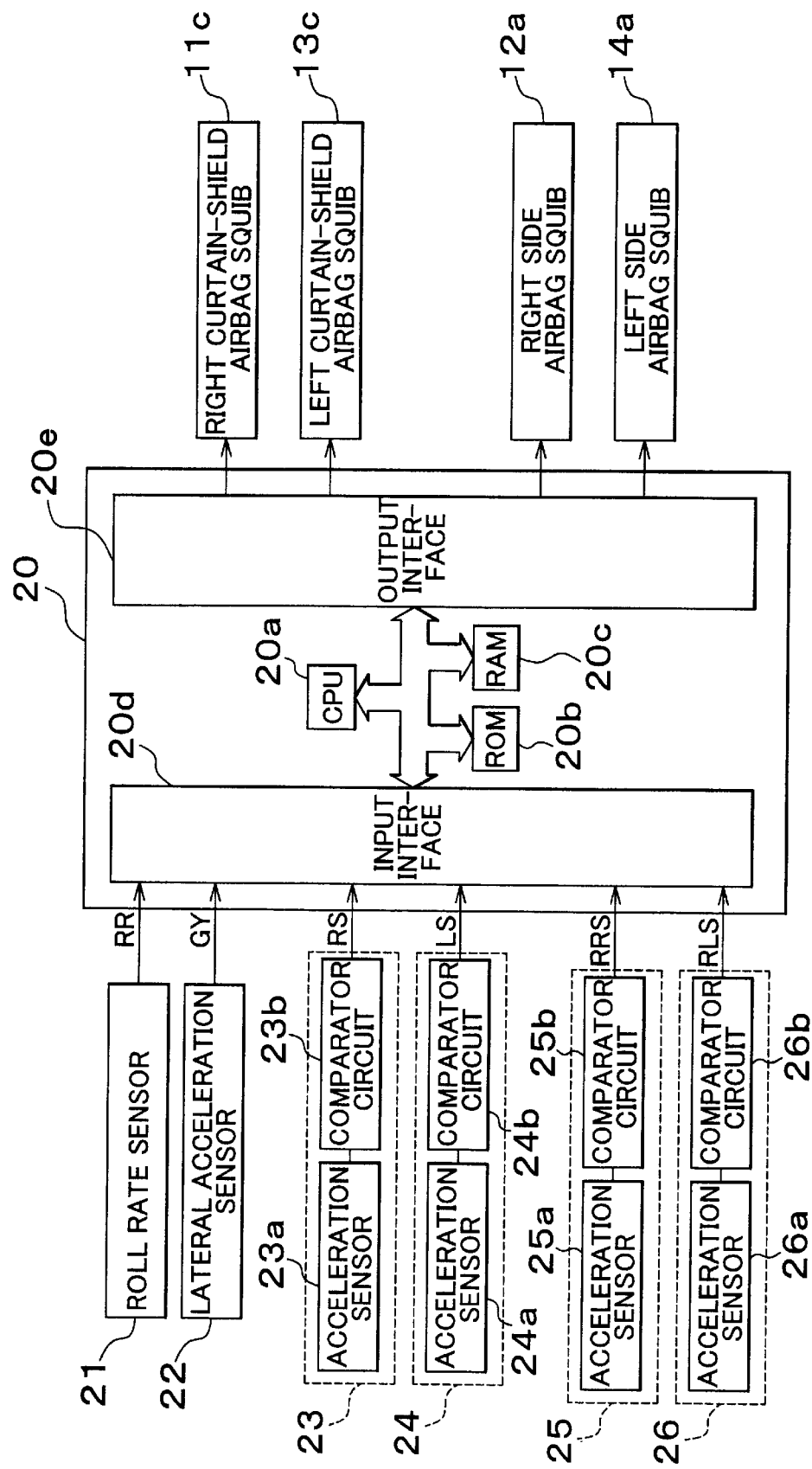
FIG. 13 is a block diagram schematically illustrating the modified form of the control system according to the first embodiment of this invention.

There will be described a modification of the first embodiment described above. The control system according to this modification is applicable to a vehicle-occupant protecting apparatus which includes a rear right side-crash sensor 25 and a rear left side-crash sensor 26, as shown in FIG. 12, in addition to the vehicle-occupant protecting devices described above with respect to the first embodiment. As shown in FIG. 13, the rear right and left side-crash sensors 25, 26 are also connected to the input interface 20d.

The rear right side-crash sensor 25 includes an acceleration sensor 25a and a comparator circuit 25b. The acceleration sensor 25a is fixedly disposed adjacent to a right rear pillar (right C pillar), and is arranged to detect a lateral acceleration value of the right rear pillar. The comparator circuit 25b is arranged to compare the detected lateral acceleration value with a predetermined threshold, and generate an output signal RRS which has a logical value "I" (a high level) when the detected lateral acceleration value is larger than the threshold, and a logical value "0" (a low level) when the detected lateral acceleration value is not larger than the threshold. That is, the output signal RRS of the comparator circuit 25b having the logical value "1" (high level) indicates that a crash of the vehicle 10 has taken place on the right side of the rear right seat.

Similarly, the rear left side-crash sensor 26 includes an acceleration sensor 26a and a comparator circuit 26b. The acceleration sensor 26a is fixedly disposed adjacent to a left rear pillar (left C pillar), and is arranged to detect a lateral acceleration value of the left rear pillar. The comparator circuit 26b is arranged to compare the detected lateral acceleration value with a predetermined threshold, and generate an output signal RLS which has a logical value "1" when the detected lateral acceleration value is larger than the threshold, and a logical value "0" when the detected lateral acceleration value is not larger than the threshold. That is, the output signal RLS of the comparator circuit 26b having the logical value "1" indicates that a crash of the vehicle 10 has taken place on the left side of the rear left seat.

Figure 14:
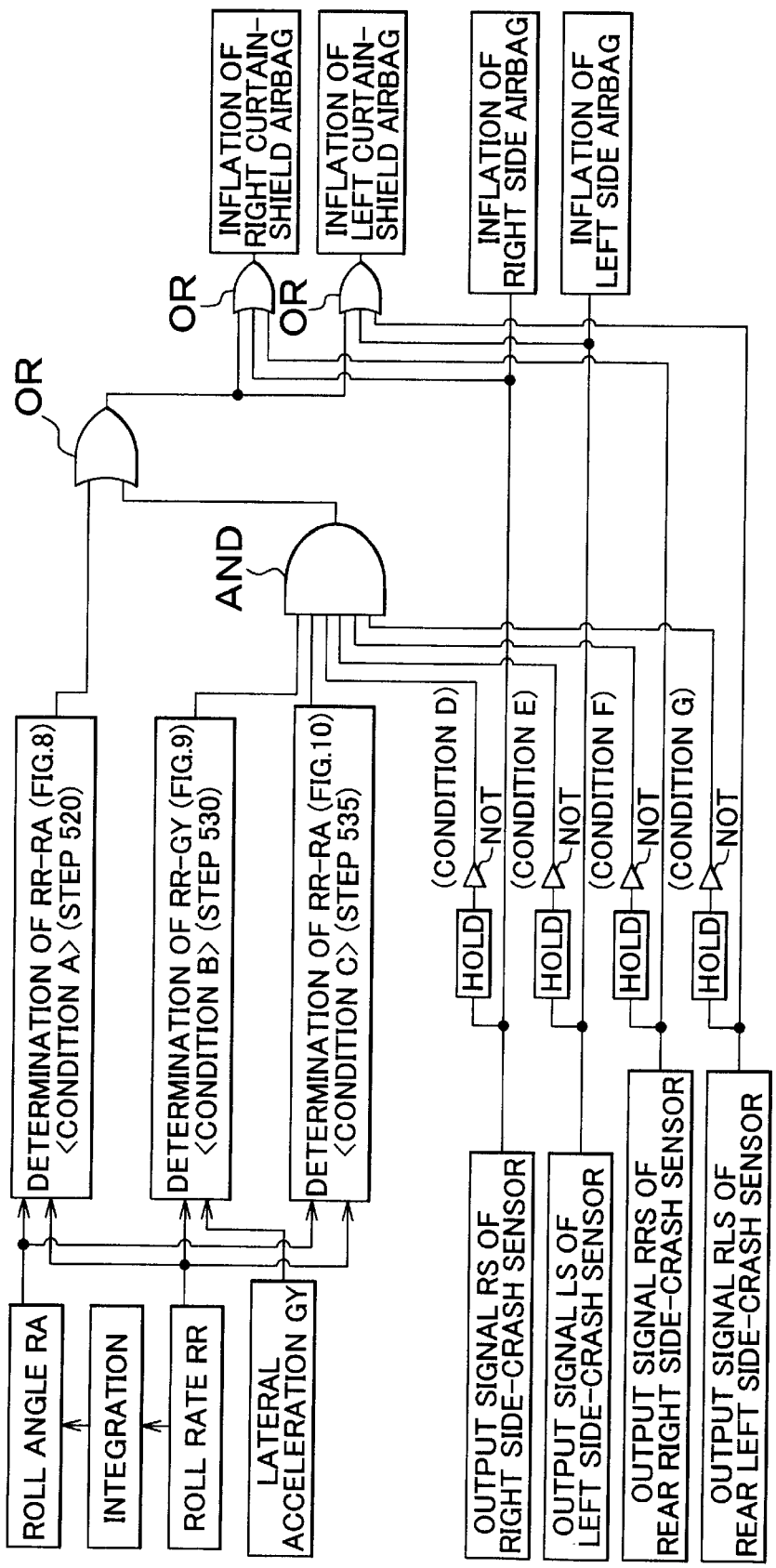
FIG. 14 is a diagram illustrating exemplary functions of the modified form of the control system according to the first embodiment of this invention.

The operation of the control system according to the present modified arrangement is illustrated in the logic circuit diagram of FIG. 14. The control system is arranged to make the determination as to whether the vehicle 10 has a rollover motion, in the same manner as in the first embodiment, and inflate both of the right and left curtain-shield airbags 11, 13 when the determination is made that the vehicle has a rollover motion. The control system is further arranged to make the determination as to whether a crash of the vehicle 10 has taken place on its right or left side, based on the output signals RS, LS of the front right and left side-crash sensors 23, 24, and inflate one of the right or left curtain-shield airbags 11, 13 that corresponds to the right or left side of the vehicle on which the side crash has taken place, and one of the right or left side airbags 12, 14 that corresponds to the right or left side on which the side crash has taken place.

The present modified control system is also arranged to invalidate the determination that the vehicle 10 has a rollover motion, which is made based on the actual roll rate RR and the actual lateral acceleration value GY, even when the rollover condition B is satisfied. This determination is invalidated for the predetermined time T10 after the logical value of the output signal RS of the front right side-crash sensor 23 has changed from "0" to "1," and for the predetermined time T20 after the logical value of the output signal LS of the front left side-crash sensor 24 has changed from "0" to "1." The present control system is further arranged to invalidate the determination that the vehicle 10 has a rollover motion, which is made based on the actual roll rate RR and the actual lateral acceleration value GY, while a post-crash time condition F is not satisfied (while the output of the HOLD circuit corresponding to the rear right side-crash sensor 25 is "0"). The post-crash time condition F is not satisfied for a predetermined time after the logical value of the output signal RRS of the side-crash sensor 25 has changed from "0" to "1." The present control system is further arranged to invalidate the above-indicated determination, while a post-crash time condition G is not satisfied (while the output of the HOLD circuit corresponding to the rear left side-crash sensor 26 is "0"). The post-crash time condition G is not satisfied for a predetermined time after the logical value of the output signal RLS of the side-crash sensor 26 has changed from In the present modified control system, the right curtain-shield airbag 11 is inflated when the logical value of the output signal RRS has changed from "0" to "1," and the left curtain-shield airbag 13 is inflated when the logical value of the output signal RLS has changed from "0" to "1." Thus, the curtain-shield airbag 11 or 13 on the side of the vehicle 10 on which a rear side crash has taken place can be inflated at an adequate timing, and the determination due to this rear side crash that the vehicle 10 has a rollover motion is invalided to avoid unnecessary inflation of the curtain-shield airbag 11, 13 on the other side of the vehicle.

It will be understood from the foregoing description of the first embodiment and its modification that when the determination is made that the vehicle 10 has a rollover motion based on the lateral acceleration value of the center pillar (center pillar or rear pillar in the modification) and the roll rate RR, this determination is invalided for the predetermined time, to avoid an unnecessary operation of the vehicle-occupant protecting device (curtain-shield airbag 11, 13 on the side of the vehicle 10 on which the side crash has not taken place). If the determination that the vehicle 10 has a rollover motion is made based on the roll rate RR and the lateral acceleration value GY while a crash of the vehicle has not taken place, this determination is invalidated when the point determined by the roll rate and angle RR, RA lies within the predetermined rollover-determination permitting region. This arrangement also prevents the unnecessary operation of the vehicle-occupant protecting device.

Second Embodiment

There will next be described a control system according to a second embodiment of this invention. This second embodiment is arranged such that in the event of a front or rear crash on the front or rear side of the vehicle 10, as well as in the event of a side crash of the right or left side, the determination of a rollover action of the vehicle 10 based on the roll rate RR and the lateral acceleration value GY is invalided for a predetermined time after the moment of detection of the crash, in order to avoid unnecessary operations of the vehicle-occupant protecting device or devices (curtain-shield airbags).

Figure 15:
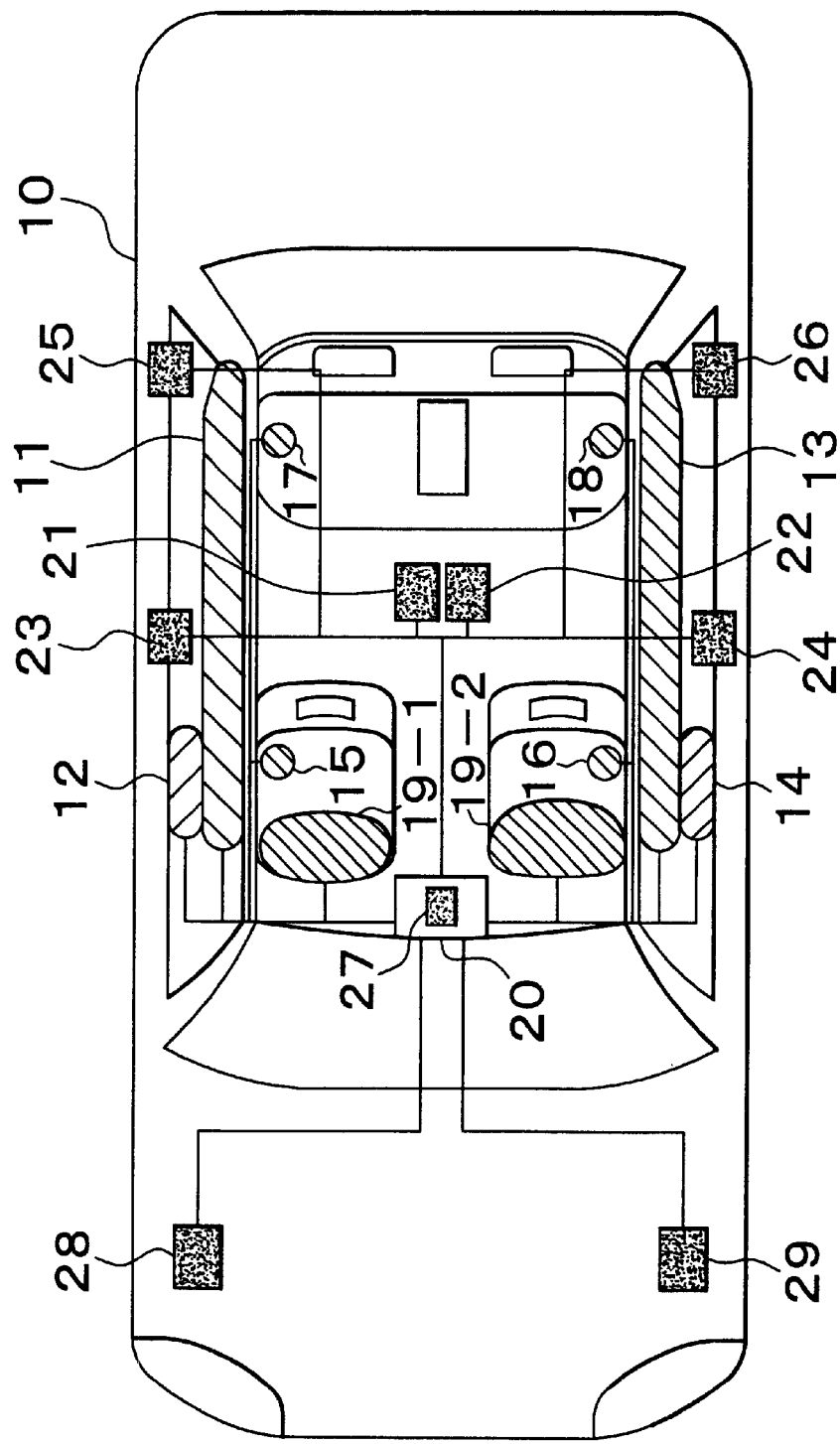
FIG. 15 is a schematic plan view of an automotive vehicle provided with a control system according to a second embodiment of this invention.

Referring to FIG. 15, there is shown an vehicle-occupant protecting apparatus of the vehicle 10 to which the present control system is applicable. This vehicle-occupant protecting apparatus includes the right curtain-shield airbag 11, right side airbag 12, left curtain-shield airbag 13 and left side airbag 14. The control system includes the electric control device 20, roll rate sensor 21, lateral acceleration sensor 22, front right side-crash sensor 23, front left side-crash sensor 24, rear right side-crash sensor 25 and rear left side-crash sensor 26. Since this arrangement of the vehicle-occupant protecting apparatus is identical with the modified arrangement of FIGS. 12–14 of the first embodiment, no further description is deemed necessary.

The vehicle-occupant protecting apparatus of the vehicle 10 further includes a front right (vehicle-operator) seat-belt pre-tensioner 15, a front left (front passenger) seat-belt pre-tensioner 16, a rear right seat-belt pre-tensioner 17, a rear left seat-belt pre-tensioner 18, an operator-seat front-crash airbag 19-1, a front-passenger-seat front-crash airbag 19-2, a floor acceleration sensor 27, a right front satellite sensor 28, and a left front satellite sensor 29.

The front right (vehicle-operator) seat-belt pre-tensioner 15, front left (front passenger) seat-belt pre-tensioner 16, rear right seat-belt pre-tensioner 17 and rear left seat-belt pre-tensioner 18 are operated when predetermined conditions are satisfied, to remove a slack or loose state of seat belts of the respective front right and left, and rear right and left seats in a relatively short time.

The operator-seat front-crash airbag 19-1 is an airbag well known in the art, which is accommodated in a central part of the steering wheel of the vehicle 10. When this airbag 19-1 is inflated, it expands so as to project from the central part of the steering wheel, in the rearward direction of the vehicle, for protecting the chest and other portions of the operator's body. The front-passenger front-crash airbag 19-2 is also an airbag well known in the art, which is accommodated in a dash panel located in front of the front-passenger seat. When this airbag 19-2 is inflated, it expands so as to project from the dash panel in the rearward direction of the vehicle, for protecting the chest and other portions of the passenger's body.

Figure 16:
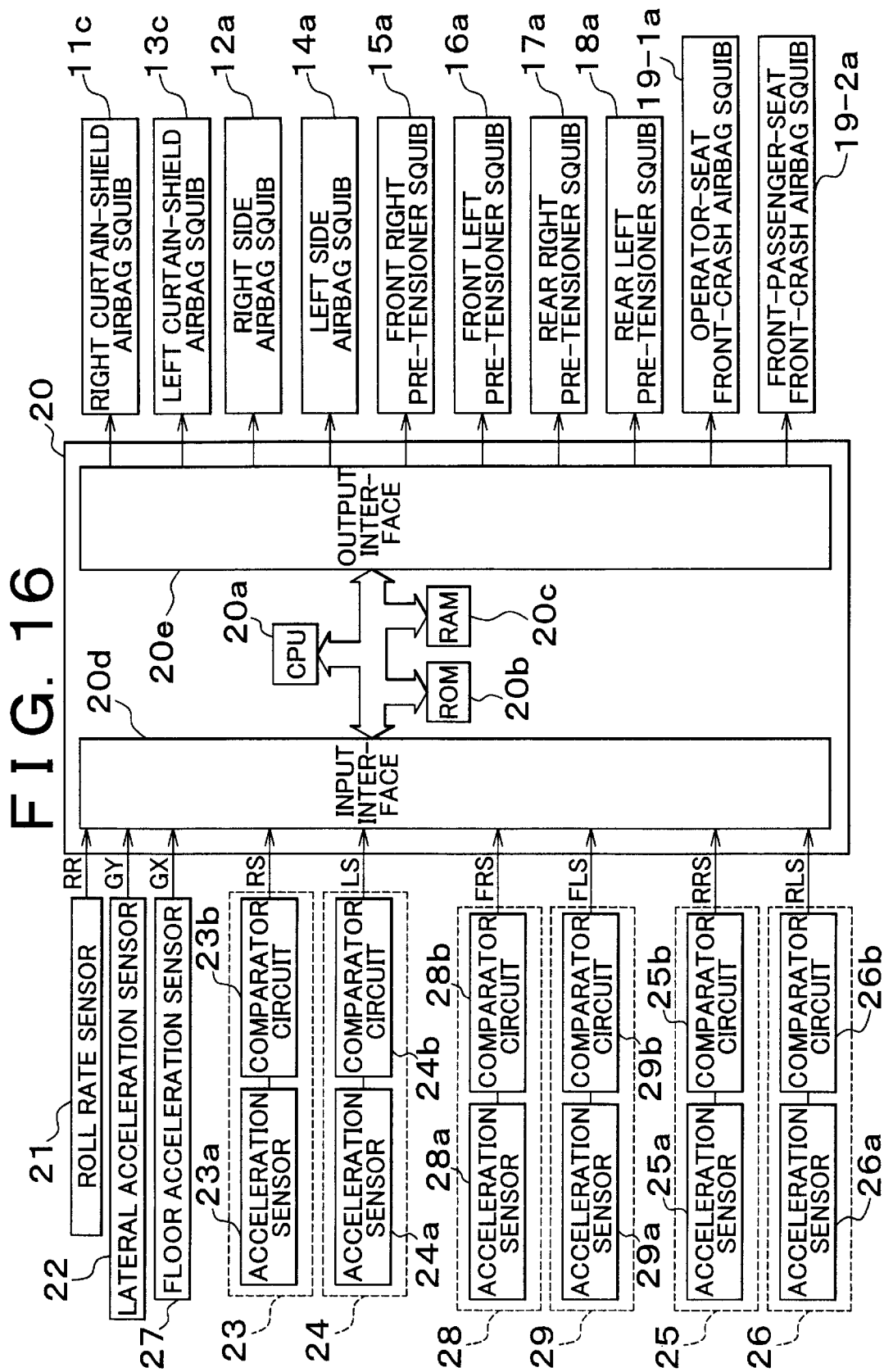
FIG. 16 is a block diagram schematically illustrating the control system according to the second embodiment of this invention.

The electric control device 20 is fixed in a floor tunnel in a substantially central portion of the vehicle body, as shown in FIG. 15, and is constituted by a microcomputer incorporating the CPU 20a, ROM 20b, RAM 20c, input interface 20d and output interface 20e, which are interconnected to each other by a bus, as schematically shown in the block diagram of FIG. 16.

To the input interface 20d of the electric control device 20, there are connected the roll rate sensor 21, lateral acceleration sensor 22, front right side-crash sensor 23, front left side-crash sensor 24, rear right side-crash sensor 25 and rear left side-crash sensor 26, the output signals of which are received by the CPU 20a. To the output interface 20e of the electric control device 20, there are connected the right curtain-shield airbag squib 11c, left curtain-shield airbag squib 13c, right side airbag squib 12a, and left side airbag squib 14a. The CPU 20a is arranged to apply suitable ignition signals (drive signals) to those squibs 11c, 13c, 12a, 14a.

To the input interface 20d of the electric control device 20, there are also connected the floor accelerator sensor 27, right front satellite sensor 28 and left front satellite sensor 29, the output signals of which are received by the CPU 20a.

To the output interface 20e of the electric control device 20, there are connected; a squib 15a for the front right seat-belt pre-tensioner 15; a squib 16a for the front left seat-belt pre-tensioner 16; a squib 17a for the rear right seat-belt pre-tensioner 17; a squib 18a for the rear left seat-belt pre-tensioner 18; a squib 19-1a for the operator-seat front-crash airbag 19-1; and a squib 19-2a for the front-passenger-seat front-crash airbag 19-2. The CPU 20a is arranged to apply suitable ignition signals (drive signals) to those squibs 15a, 16a, 17a, 18a, 19-1a, 19-2a.

The floor acceleration sensor 27 is accommodated within the electric control device 20, and arranged to detect an acceleration GX of the floor tunnel in the central part of the vehicle 10, which occurs in its longitudinal direction. A positive value of the acceleration GX (hereinafter referred to as "longitudinal acceleration value GX") indicates the acceleration in the forward direction of the vehicle.

The right front satellite sensor 28 includes an acceleration sensor 28a and a comparator circuit 28b. The acceleration sensor 28a is attached to a side member on the right side of the vehicle 10, and located at a position adjacent to the extreme front end of the vehicle. The acceleration sensor 28a is arranged to detect an acceleration value at the above-indicated position. A positive value of the acceleration detected by the acceleration sensor 28a indicates the acceleration in the forward direction of the vehicle. The comparator circuit 28b is arranged to compare the detected acceleration value with a predetermined threshold, and generate an output signal FRS which has a logical value "1" (a high level) when the detected acceleration value is larger than the threshold, and a logical value "0" (a low level) when the detected acceleration value is not larger than the threshold.

Similarly, the left front satellite sensor 29 includes an acceleration sensor 29a and a comparator circuit 29b. The acceleration sensor 29a is attached to a side member on the left side of the vehicle 10, and located at a position adjacent to the extreme front end of the vehicle. The acceleration sensor 29a is arranged to detect an acceleration value at the above-indicated position. A positive value of the acceleration detected by the acceleration sensor 29a indicates the acceleration in the forward direction of the vehicle. The comparator circuit 29b is arranged to compare the detected acceleration value with a predetermined threshold, and generate an output signal FLS which has a logical value "1" (a high level) when the detected acceleration value is larger than the threshold, and a logical value "0" (a low level) when the detected acceleration value is not larger than the threshold.

Then, an operation of the control system for the vehicle-occupant protecting apparatus arranged as described above will be described, primarily regarding aspects of this control system which are different from those of the first embodiment. The operation of the control system described below is performed according to a control program (not shown) executed by the CPU 20a of the electric control device 20.

Determination on Front Crash of Vehicle

Figure 17:
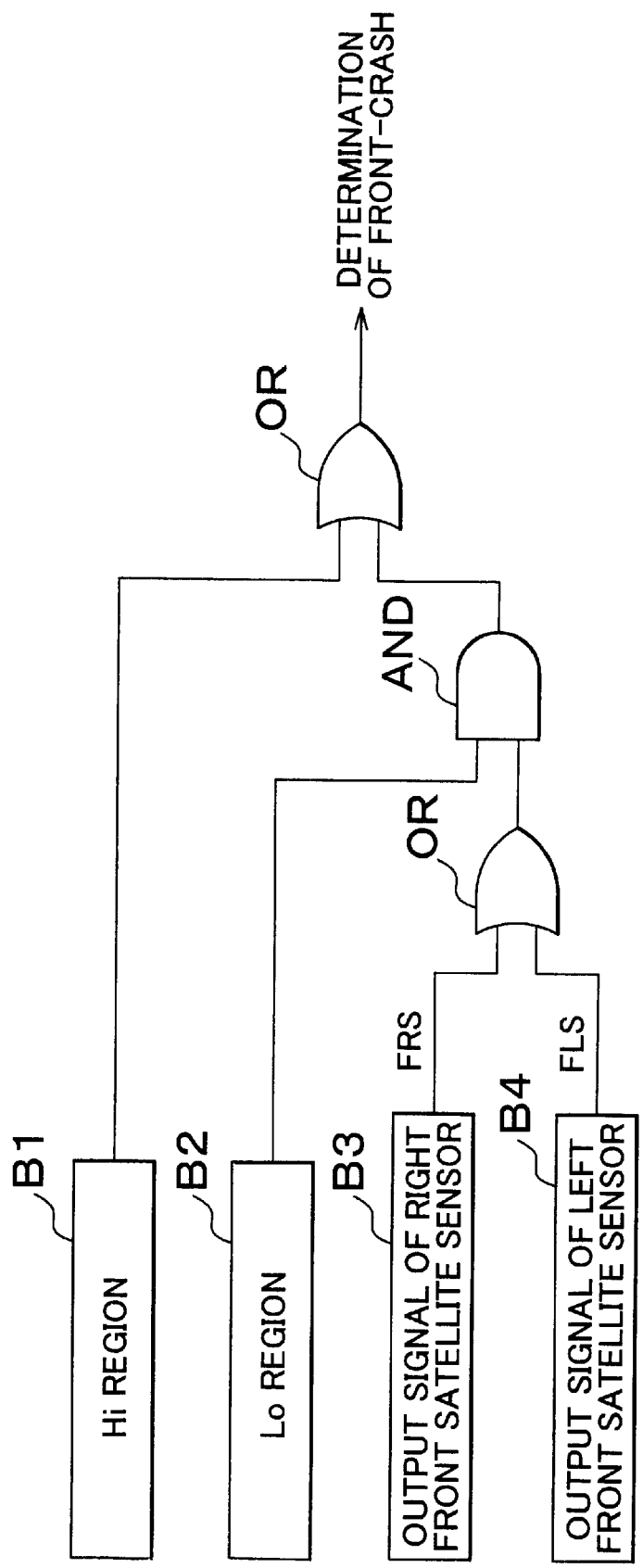
FIG. 17 is a logic circuit diagram illustrating conditions for the control system according to the second embodiment of this invention.
Figure 18:
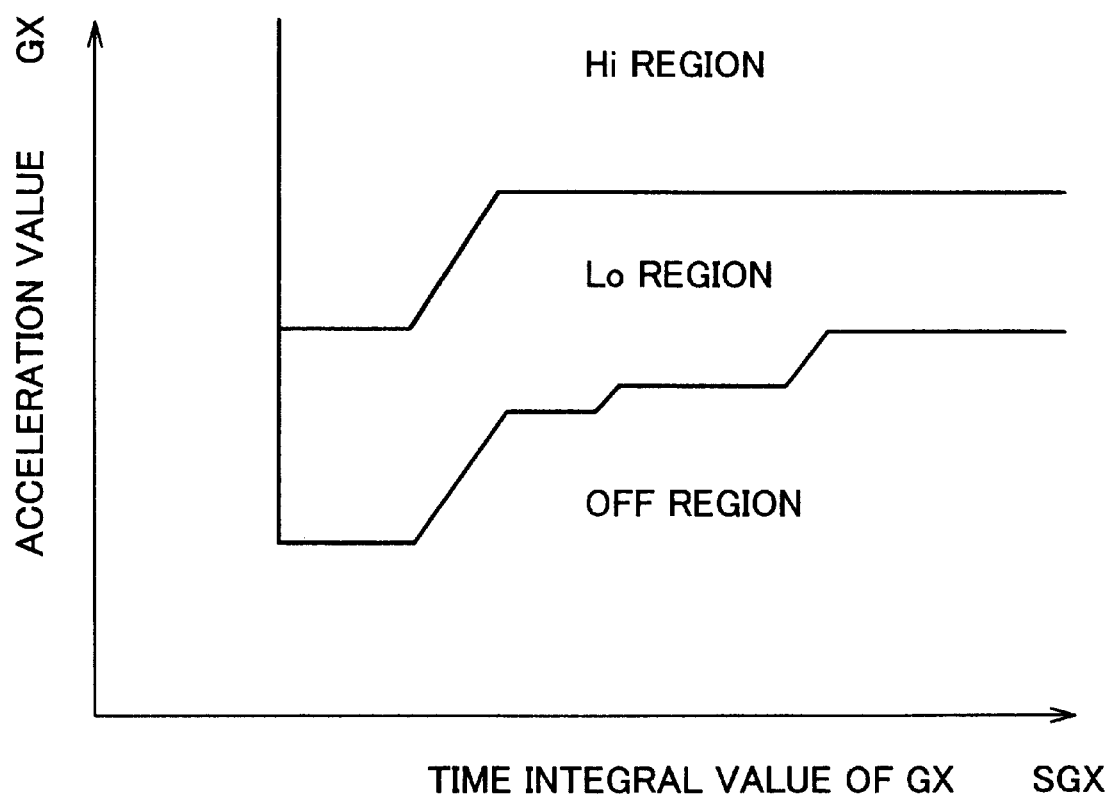
FIG. 18 is a view indicating a data map used according to the second embodiment of this invention.

The CPU 20a effects a determination as to whether the vehicle 10 has a front crash, at a predetermined time interval. This determination is effected by a logic circuit shown in FIG. 17. Block B1 in FIG. 17 indicates a determination by the CPU 20a as to whether a point determined by the acceleration value GX of the floor tunnel of the vehicle and a time integral value SGX of the acceleration value GX during a time interval between the moments of the last and present cycles of execution of the above-indicated control program lies within a high (Hi) region indicated in the graph of FIG. 18. The above-indicated point indicates the present state of the vehicle 10. The time integral value SGX of the acceleration value GX will be referred to simply as "time integral value SGX." A data map (data table) representing the Hi region, a low (Lo) region and an Off region as shown in FIG. 18 is stored in the ROM 20b. These Hi, Lo and OFF regions are defined in a two-dimensional coordinate system in which the acceleration value GX and the time integral value SGX are taken along respective two axes. Block B2 indicates a determination by the CPU 20a as to whether the above-indicated point determined by the acceleration value GX and the time integral value SGX lies within the Lo region of FIG. 18.

Blocks B3 and B4 indicate monitoring operations performed by the CPU 20a to determine whether the logical values of the output signals FRS and FLS of the right and left front satellite sensors 28 and 29 have changed to "1."

The CPU 20a determines that the vehicle 10 has a front crash, (1) when the point determined by the acceleration value GX and the time integral value SGX lies within the Hi region of FIG. 18, or (2) when the above-indicated point lies within the Low region of FIG. 18 while the logical value of either one of the output signals FRS and FLS is "1."

Determination of Rear Crash of Vehicle

The CPU 20a effects a determination as to whether the vehicle 10 has a rear crash, at a predetermined time interval. This determination is effected by determining whether the following inequality is satisfied or not:

$$\int GXdt < Kth < 0 \text{(time interval of } t1-t2)$$

Namely, the CPU 20a obtains a time integral value of the acceleration value GX of the floor tunnel detected by the floor acceleration sensor 27, during a time interval between a past point of time t1 and the present point of time t2. If the time integral value is smaller than a negative threshold value Kth, the CPU 20a determines that the vehicle 10 has a rear crash.

Figure 19:
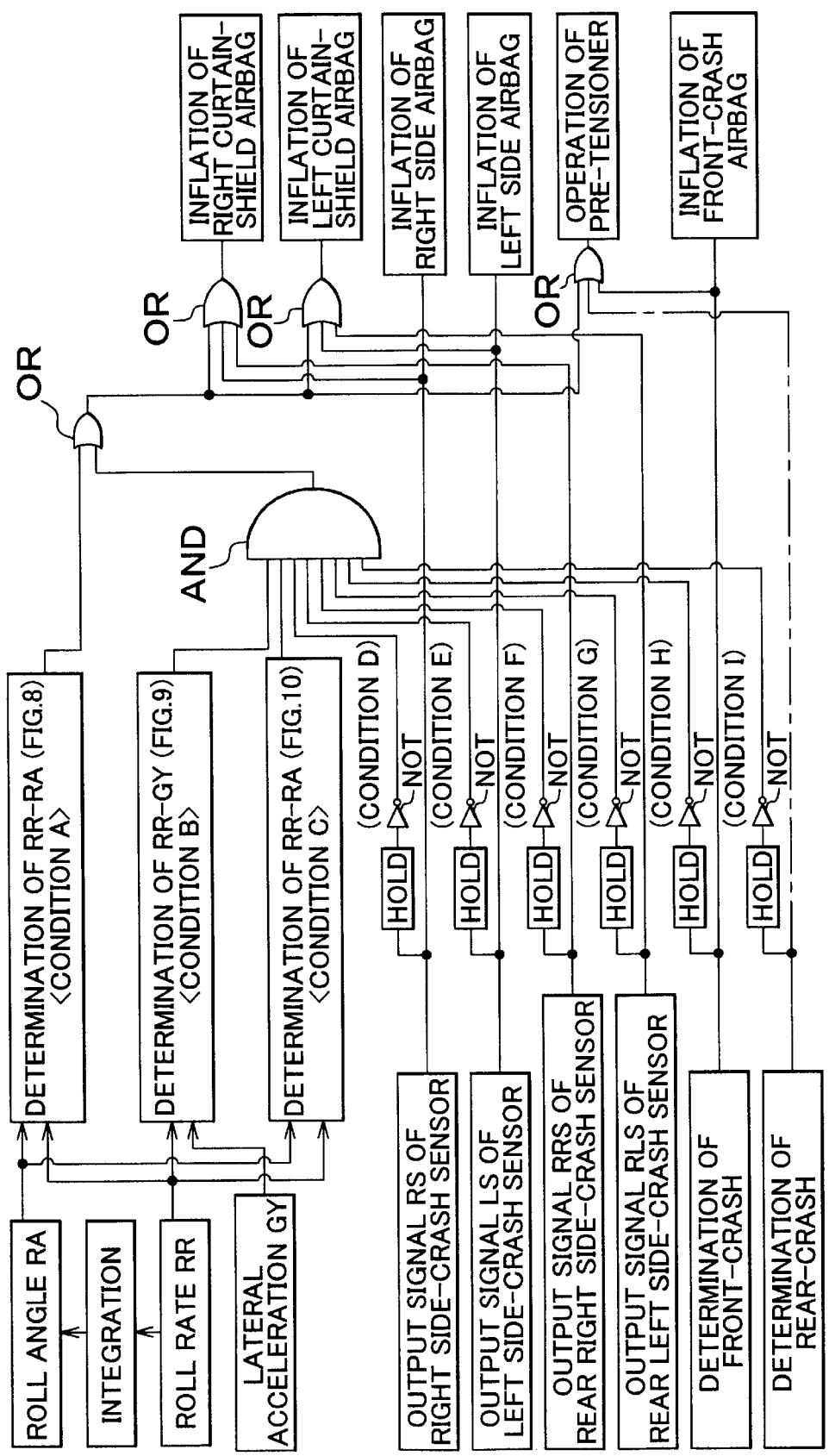
FIG. 19 is a diagram illustrating the functions of the control system according to the second embodiment of this invention.

Operation to Control Protecting Apparatus According to Determination of Crashes and Rollover Motions Referring next to the logic circuit diagram of FIG. 19, there will be described the operations of the control system to control the vehicle-occupant protecting apparatus according to the determinations by the CPU 20a on the crashes and rollover motions of the vehicle 10. The control operations by the logic circuit shown in FIG. 19 are performed according to a control program (not shown) executed by the CPU 20a with a predetermined cycle time. HOLD circuits shown in FIG. 19 function to hold the logical value "1" of the input signal for a predetermined time after the logical value has changed from "0" to "1." The predetermined times of the different HOLD circuits may be the same or may different from each other. NOT circuits shown in FIG. 19 function to change the logical values "1" and "0" of the input signal to "0" and "1," respectively.

The CPU 20a effect determinations as to whether the condition A through condition I are satisfied, at a predetermined time interval. The determinations regarding the conditions A–G have been described above with respect to the first embodiment and its modified arrangement. No further description of these determinations is deemed necessary. The condition H is not satisfied for the predetermined time after the moment of determination that the vehicle 10 has a front crash. Similar, the condition I is not satisfied for the predetermined time after the moment of determination that the vehicle 10 has a rear crash.

The CPU 20a operates or activates the appropriate vehicle-occupant protecting devices depending upon whether the conditions A–I are satisfied or not. Described in detail, the CPU 20a applies the ignition signals to the squibs 11c and 13c to inflate both of the right curtain-shield airbag 11 and the left curtain-shield airbag 13, when the rollover condition A is satisfied, that is, when the determination that the vehicle 10 has a rollover motion is made on the basis of the rollover data map of FIG. 8 and the actual roll rate and angle RR, RA. When the rollover condition A is satisfied, the CPU 20a also applies the ignition signals to the squibs 15a, 16a, 17a and 18a to activate all of the seat-belt pre-tensioners, namely, the front right seat-belt pre-tensioners 15, front left seat-belt pre-tensioner 16, rear right seat-belt pre-tensioner 17 and rear left seat-belt pre-tensioner 18.

The CPU 20a applies the ignition signals to the squibs 11c, 13c, 15a–18a to inflate both of the right and left curtain-shield airbags 11, 13 and to activate all of the seat-belt pre-tensioners, when all of the conditions B–I are satisfied.

That is, the CPU 20a determines that the vehicle 10 has a rollover motion, and inflate both of the curtain-shield airbags 11, 13 and operate all of the seat-belt pre-tensioners 15–18, when all of the conditions B–E are satisfied in the situations described below. Namely, the rollover condition B is satisfied when the determination that the vehicle 10 has a rollover motion is made based on the rollover data map of FIG. 9 and the actual roll rate RR and the actual lateral acceleration value GY. The rollover-determination permitting condition C is satisfied when the determination that the state of the vehicle 10 lies in the rollover-determination permitting region is made based on the rollover-determination permitting data map of FIG. 10 and the actual roll rate and angle RR, RA.

The post-crash time condition D is satisfied when the predetermined time has passed after the moment of the determination that the vehicle 10 has a right side crash. The post-crash time condition E is satisfied when the predetermined time has passed after the moment of the determination that the vehicle 10 has a left side crash. The post-crash time condition F is satisfied when the predetermined time has passed after the moment of the determination that the vehicle 10 has a crash on the right side of the rear right seat. The post-crash time condition G is satisfied when the predetermined time has passed after the moment of the determination that the vehicle 10 has a crash on the left side of the rear left seat. The post-crash time condition H is satisfied when the predetermined time has passed after the moment of the determination that the vehicle 10 has a front crash, and the post-crash time condition I is satisfied when the predetermined time has passed after the moment of the determination that the vehicle 10 has a rear crash. Thus, the determinations as to whether the conditions D–I are satisfied are effected, and the AND circuits shown in FIG. 19 are provided, for the purpose of invalidating the determination that the vehicle 10 has a rollover motion.

The CPU 20a inflates the right curtain-shield airbag 11 and the right side airbag 12 when the logical value of the output signal RS of the front right side-crash sensor 23 has changed to "1," and inflates the left curtain-shield airbag 13 and the left side airbag 14 when the logical value of the output signal LS of the front left side-crash sensor 24 has changed to "1." The CPU 20a also inflates the right curtain-shield airbag 11 when the logical value of the output signal RRS of the rear right side-crash sensor 25 has changed to "1," and also inflates the left curtain-shield airbag 13 when the logical value of the output signal RLS of the rear left side-crash sensor 26 has changed to "1." However, the CPU 20a may be arranged to inflate the right side airbag 12 when the logical value of the output signal RRS has changed to "1," and inflate the left side airbag 14 when the logical value of the output signal RLS has changed to "1." Further, the CPU 20a may be arranged to operate all of the seat-belt pre-tensioners 15–18 when the logical value of any one of the output signals RS, LS, RRS, RLS of the side-crash sensors 23–25 has changed to "1."

Further, the CPU 20a inflates the operator-seat front-crash airbag 19-1 and the front-passenger front-crash airbag 19-2 and operates all of the seat-belt pre-tensioners 15 18, when the CPU 20a determines that the vehicle 10 has a front crash. The CPU 20a may be arranged to operate all of the pre-tensioners 15–18 when the CPU20a determines that the vehicle 10 has a rear crash.

According to the control system of the second embodiment described above, the determination that the vehicle 10 has a rollover action, which is made based on the roll rate RR and the lateral acceleration value GY, is invalided for a predetermined time after a front or rear crash as well as a side crash of the vehicle 10 has taken place, that is, when a collision of the vehicle 10 has taken place on any one of its four sides. This arrangement makes it possible to avoid unnecessary operations of the vehicle-occupant protecting devices (curtain-shield airbags).

It will be understood that the present invention is not limited to the illustrated embodiments, and may be embodied with various changes and modifications, without departing from the scope of this invention. For instance, the amount of slackness or looseness of the seat belts may be reduced instantaneously by operating respective pre-tensioners provided in the seats of the vehicle, when the logical value of the output signal RS, LS of the right or left side-crash sensor 23, 24 has changed from "0" to "1." Although the illustrated embodiments are arranged to inflate both of the right and left curtain-shield airbags 11, 13 when the determination that the vehicle 10 has a rollover motion is made, the control system may be arranged to inflate only one of the two curtain-shield airbags 11, 13 on one side of the vehicle 10 on which a side crash has taken place. The manners of determinations as to whether the vehicle has rollover motion, and crashes (side, front and rear crashes) are not limited to those in the illustrated embodiments described above.

The second embodiment may be modified to control the vehicle-occupant protecting devices, by effecting the determination on the front crash of the vehicle while taking account of the running speed of the vehicle, such that (1): none of the vehicle-occupant protecting devices are operated while the vehicle running speed is lower than a first threshold value, even when the determination that the vehicle has a front crash is made; (2) only the seat-belt pre-tensioners 15–18 are operated when the determination that the vehicle has a front crash is made while the vehicle running speed is equal to or higher than the first threshold value and lower than a second threshold value higher than the first threshold value, that is, when a first front-crash condition is satisfied; and (3) the seat-belt pre-tensioners 15–18, the operator-seat front-crash airbag 19-1 and the front-passenger-seat front-crash airbag 19-2 are operated when the determination that the vehicle has a front crash is made while the vehicle running speed is equal to or higher than the second threshold value, that is, when a second front-crash condition is satisfied. In this case, the condition H which is used to effect the determination on the front crash and which has been described by reference to FIG. 19 may be replaced by one of the first and second front-crash conditions indicated above.

Each of the operator-seat and front-passenger-seat airbags 19-1 and 19-2 provided in the vehicle-occupant protecting apparatus controlled by the control system according to the second embodiment may be modified such that each airbag 19-1, 192 has a first-stage inflator and a second-stage inflator (a plurality of inflators) and squibs corresponding to the respective inflators.

In this case, the control system may be arranged to control the vehicle-occupant protecting devices, such that: (1) none of the vehicle-occupant protecting devices are operated while the vehicle running speed is lower than a first threshold value, even when the determination that the vehicle has a front crash is made; (2) only the seat-belt pre-tensioners 15–18 are operated when the determination that the vehicle has a front crash is made while the vehicle running speed is equal to or higher than the first threshold value and lower than a second threshold value higher than the first threshold value, that is, when a first front-crash condition is satisfied; (3) the seat-belt pre-tensioners 15–18 are operated, and only the first-stage inflator of each of the operator-seat and front-passenger-seat front-crash airbags 19-1, 19-2 is activated to comparatively slowly inflate the front-crash airbags 19-1, 19-2, when the determination that the vehicle has a front crash is made while the vehicle running speed is equal to or higher than the second threshold value and lower than a third threshold value higher than the second threshold value, i.e., when a second front-crash condition is satisfied; and (4) the seat-belt pre-tensioners 15–18 are operated, and both of the first-stage and second-stage inflators of the front-crash airbags 19-1, 19-2 are activated to rapidly inflate the airbags 19-1, 19-2, when the determination that the vehicle has a front crash is made while the vehicle running speed is equal to or higher than the third threshold value, that is, when a third front-crash condition is satisfied. In this case, the condition H which is used to effect the determination on the front crash and which has been described by reference to FIG. 19 may be replaced by one of the first, second and third front-crash conditions indicated above.

In the illustrated embodiments, the controller is implemented with a general purpose processor. It will be appreciated by those skilled in the art that the controller can be implemented using a single special purpose integrated circuit (e.g., ASIC) having a main or central processor section for overall, system-level control, and separate sections dedicated to performing various different specific computations, functions and other processes under control of the central processor section. The controller can be a plurality of separate dedicated or programmable integrated or other electronic circuits or devices (e.g., hardwired electronic or logic circuits such as discrete element circuits, or programmable logic devices such as PLDs, PLAs, PALs or the like). The controller can be suitably programmed for use with a general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the procedures described herein can be used as the controller. A distributed processing architecture can be used for maximum data/signal processing capability and speed.

While the invention has been described with reference to what are preferred embodiments thereof, it is to be understood that the invention is not limited to the preferred embodiments or constructions. To the contrary, the invention is intended to cover various modifications and equivalent arrangements. In addition, while the various elements of the preferred embodiments are shown in various combinations and configurations, which are exemplary, other combinations and configurations, including more, less or only a single element, are also within the spirit and scope of the invention.

What is claimed is:

1. A control system for controlling a vehicle-occupant protecting apparatus provided on a vehicle such that the apparatus is controlled upon determination that the vehicle has had a rollover motion, said control system comprising:
   a first detector that determines whether the vehicle has crashed;
   a second detector that determines whether the vehicle has had a rollover motion;
   an invalidating device that invalidates the determination by said second detector that the vehicle has had the rollover motion, such that the determination by the second detector is invalidated for a predetermined time after the determination by said first detector that the vehicle has crashed; and
   a controller that controls said vehicle-occupant protecting apparatus based on outputs of said second detector and said invalidating device.

2. The control system according to claim 1, wherein the vehicle-occupant protecting apparatus includes a first vehicle-occupant protecting device and a second vehicle-occupant protecting device, said controller controlling the first vehicle-occupant protecting device when said first detector determines that the vehicle has crashed, and controls the second vehicle-occupant protecting device when said second detector determines that the vehicle has had the rollover motion.

3. The control system according to claim 2, wherein said second detector determines that the vehicle has had the rollover motion when a point determined by an actual roll rate and an actual roll angle of the vehicle has moved across a threshold line which defines a predetermined relationship between the roll rate and angle.

4. The control system according to claim 2, wherein that said second detector determines that the vehicle has had the rollover motion when a point determined by an actual roll rate and an actual lateral acceleration value of the vehicle has moved across a threshold line which defines a predetermined relationship between the roll rate and lateral acceleration value.

5. The control system according to claim 4, wherein that said invalidating device invalidates, for the predetermined time, the determination by said second detector that the vehicle has had the rollover motion made when the point determined by the actual roll rate and the actual lateral acceleration value of the vehicle has moved across said threshold line which defines the predetermined relationship between the roll rate and lateral acceleration value.

6. The control system according to claim 2, wherein said second detector determines that the vehicle has had the rollover motion when a point determined by an actual roll rate and an actual lateral acceleration value of the vehicle has moved across a threshold line which defines a predetermined relationship between the roll rate and lateral acceleration value, and when a point determined by an actual roll rate and an actual roll angle of the vehicle lies within a predetermined rollover-determination permitting region.

7. The control system according to claim 6, wherein that said invalidating device invalidates, for the predetermined time, the determination by said second detector that the vehicle has had the rollover motion made when the point determined by the actual roll rate and the actual lateral acceleration value of the vehicle has moved across said threshold line which defines the predetermined relationship between the roll rate and lateral acceleration value.

8. The control system according to claim 1, wherein said first detector includes a third detector that determines whether the vehicle has had a side crash.

9. The control system according to claim 1, wherein said first detector includes a fourth detector that determines whether the vehicle has had a front crash.

10. The control system according to claim 1, wherein that said first detector includes a fifth detector that determines whether the vehicle has had a rear crash.

11. The control system according to claim 1, wherein said second detector determines that the vehicle has had the rollover motion when a point determined by an actual roll rate and an actual roll angle of the vehicle has moved across a threshold line which defines a predetermined relationship between the roll rate and angle.

12. The control system according to claim 11, wherein that said second detector determines that the vehicle has had the rollover motion when a point determined by an actual roll rate and an actual lateral acceleration value of the vehicle has moved across a threshold line which defines a predetermined relationship between the roll rate and lateral acceleration value.

13. The control system according to claim 12, wherein said invalidating device invalidates, for the predetermined time, the determination by said second detector that the vehicle has had the rollover motion made when the point determined by the actual roll rate and the actual lateral acceleration value of the vehicle has moved across said threshold line which defines the predetermined relationship between the roll rate and lateral acceleration value.

14. The control system according to claim 1, wherein said second detector determines that the vehicle has had the rollover motion when a point determined by an actual roll rate and an actual lateral acceleration value of the vehicle has moved across a threshold line which defines a predetermined relationship between the roll rate and lateral acceleration value.

15. The control system according to claim 14, wherein that said invalidating device invalidates, for the predetermined time, the determination by said second detector that the vehicle has had the rollover motion made when the point determined by the actual roll rate and the actual lateral acceleration value of the vehicle has moved across said threshold line which defines the predetermined relationship between the roll rate and lateral acceleration value.

16. The control system according to claim 1, wherein said second detector determines that the vehicle has had the rollover motion when a point determined by an actual roll rate and an actual lateral acceleration value of the vehicle has moved across a threshold line which defines a predetermined relationship between the roll rate and lateral acceleration value, and when a point determined by an actual roll rate and an actual roll angle of the vehicle lies within a predetermined rollover-determination permitting region.

17. The control system according to claim 16, wherein that said invalidating device invalidates, for the predetermined time, the determination by said second detector that the vehicle has had the rollover motion made when the point determined by the actual roll rate and the actual lateral acceleration value of the vehicle has moved across said threshold line which defines the predetermined relationship between the roll rate and lateral acceleration value.

18. A method for controlling a vehicle-occupant protecting apparatus provided on a vehicle such that the apparatus is controlled upon determination that the vehicle has had a rollover motion, comprising the steps of:
   determining whether the vehicle has crashed;
   determining whether the vehicle has had a rollover motion;
   invalidating the determination that the vehicle has had the rollover motion, said determination invalidated for a predetermined time after the determination that the vehicle has crashed; and
   controlling the vehicle-occupant protecting apparatus based on the determination as to whether the vehicle has had the rollover motion and the invalidation of said determination.

19. The method according to claim 18, wherein the vehicle-occupant protecting apparatus includes a first vehicle-occupant protecting device and a second vehicle-occupant protecting device, and said step of controlling the vehicle-occupant protecting apparatus comprises controlling the first vehicle-occupant protecting device when it is determined that the vehicle has crashed, and controlling the second vehicle-occupant protecting device when it is determined that the vehicle has had the rollover motion.

20. The method according to claim 18, wherein said step of determining whether the vehicle has had the rollover motion comprises determining that the vehicle has had the rollover motion when a point determined by an actual roll rate and an actual lateral acceleration value of the vehicle has moved across a threshold line which defines a predetermined relationship between the roll rate and lateral acceleration value, and when a point determined by an actual roll rate and an actual roll angle of the vehicle lies within a predetermined rollover-determination permitting region.

21. The method according to claim 20, wherein said step of invalidating the determination that the vehicle has had the rollover motion comprises invalidating, for the predetermined time, the determination that the vehicle has had the rollover motion made when the point determined by the actual roll rate and the actual lateral acceleration value of the vehicle has moved across said threshold line which defines the predetermined relationship between the roll rate and lateral acceleration value.

* * * * *